(12) United States Patent
Smits

(10) Patent No.: US 10,379,220 B1
(45) Date of Patent: Aug. 13, 2019

(54) HYPER-RESOLVED, HIGH BANDWIDTH SCANNED LIDAR SYSTEMS

(71) Applicant: Gerard Dirk Smits, Los Gatos, CA (US)

(72) Inventor: Gerard Dirk Smits, Los Gatos, CA (US)

( * ) Notice: Subject to any disclaimer, the term of this patent is extended or adjusted under 35 U.S.C. 154(b) by 0 days.

(21) Appl. No.: 16/261,528

(22) Filed: Jan. 29, 2019

Related U.S. Application Data

(60) Provisional application No. 62/709,715, filed on Jan. 29, 2018.

(51) Int. Cl.

| | |
|---|---|
| *G01S 17/10* | (2006.01) |
| *G01S 7/486* | (2006.01) |
| *G01S 7/484* | (2006.01) |
| *G01S 7/481* | (2006.01) |
| *G01T 1/24* | (2006.01) |
| *G01S 17/93* | (2006.01) |
| *G01S 17/89* | (2006.01) |

(52) U.S. Cl.
CPC .............. *G01S 17/10* (2013.01); *G01S 7/484* (2013.01); *G01S 7/4811* (2013.01); *G01S 7/4817* (2013.01); *G01S 7/4863* (2013.01); *G01S 17/936* (2013.01); *G01T 1/248* (2013.01); *G01S 17/89* (2013.01)

(58) Field of Classification Search
CPC . G01S 7/48; G01S 17/89; G01S 17/10; G01S 7/486

See application file for complete search history.

(56) References Cited

U.S. PATENT DOCUMENTS

| | | | |
|---|---|---|---|
| 4,019,262 A | 4/1977 | Breglia et al. | |
| 4,340,274 A | 7/1982 | Spooner | |
| 4,820,041 A | 4/1989 | Davidson et al. | |
| 4,988,187 A | 1/1991 | Kuriyama | |
| 5,052,820 A | 10/1991 | McGinmss et al. | |

(Continued)

FOREIGN PATENT DOCUMENTS

| | | |
|---|---|---|
| EP | 0722109 A1 | 7/1996 |
| JP | 11119184 A | 4/1999 |

(Continued)

OTHER PUBLICATIONS

Office Communication for U.S. Appl. No. 15/444,182 dated Mar. 20, 2019, pp. 1-10.

(Continued)

*Primary Examiner* — Luke D Ratcliffe
(74) *Attorney, Agent, or Firm* — John W. Branch; Lowe Graham Jones PLLC

(57) ABSTRACT

Embodiments are directed toward a scanning LIDAR system that measures a distance to a target that reflects light from a transmitter to a receiver. A light transmitter is arranged to scan pulses of light that reflect off a remote surface (target) and illuminate fractions of the Field of View (FoV) of a receiver, such as a camera. These fractions of the FoV are smaller than a resolution provided by an array of pixels used to detect Time of Flight (ToF) reflections of the scanned pulses of light from a remote surface. The exemplary scanning LIDAR system may resolve an image of the remote surface at substantially higher resolution than the pixel resolution provided by its receiver.

20 Claims, 15 Drawing Sheets

(56) References Cited

U.S. PATENT DOCUMENTS

| | | |
|---|---|---|
| 5,107,122 A | 4/1992 | Barkan et al. |
| 5,115,230 A | 5/1992 | Smoot |
| 5,218,427 A | 6/1993 | Koch |
| 5,455,588 A | 10/1995 | Lew et al. |
| 5,506,682 A | 4/1996 | Pryor |
| 5,521,722 A | 5/1996 | Colvill et al. |
| 5,559,322 A | 9/1996 | Jacoby et al. |
| 5,572,251 A | 11/1996 | Ogawa |
| 5,580,140 A | 12/1996 | Katz et al. |
| 5,661,506 A | 8/1997 | Lazzouni et al. |
| 5,812,664 A | 9/1998 | Bernobich et al. |
| 5,914,783 A | 6/1999 | Barrus |
| 5,930,378 A | 7/1999 | Kubota et al. |
| 6,115,022 A | 9/2000 | Mayer, III et al. |
| 6,195,446 B1 | 2/2001 | Skoog |
| 6,307,526 B1 | 10/2001 | Mann |
| 6,404,416 B1 | 6/2002 | Kahn et al. |
| 6,545,670 B1 | 4/2003 | Pryor |
| 6,670,603 B2 | 12/2003 | Shimada et al. |
| 6,704,000 B2 | 3/2004 | Carpenter |
| 6,710,767 B1 | 3/2004 | Hasegawa et al. |
| 6,766,066 B2 | 7/2004 | Kitazawa |
| 6,982,683 B2 | 1/2006 | Stanton |
| 7,119,965 B1 | 10/2006 | Rolland et al. |
| 7,144,117 B2 | 12/2006 | Kojima |
| 7,182,465 B2 | 2/2007 | Fuchs et al. |
| 7,232,229 B2 | 6/2007 | Peeters et al. |
| 7,262,765 B2 | 8/2007 | Brown et al. |
| 7,289,110 B2 | 10/2007 | Hansson |
| 7,303,289 B2 | 12/2007 | Fujiwara |
| 7,511,847 B2 | 3/2009 | Silverbrook et al. |
| 7,554,652 B1 | 7/2009 | Babin et al. |
| 7,787,134 B2 | 8/2010 | Kohnen et al. |
| 7,911,444 B2 | 3/2011 | Yee |
| 8,115,728 B2 | 2/2012 | Feng |
| 8,170,329 B2 | 5/2012 | Seko et al. |
| 8,282,222 B2 | 10/2012 | Smits |
| 8,297,758 B2 | 10/2012 | Choi et al. |
| 8,430,512 B2 | 4/2013 | Smits |
| 8,493,573 B2 | 7/2013 | Chinn et al. |
| 8,573,783 B2 | 11/2013 | Smits |
| 8,696,141 B2 | 4/2014 | Smits |
| 8,711,370 B1 | 4/2014 | Smits |
| 8,773,512 B1 | 7/2014 | Rafii |
| 8,957,847 B1 | 2/2015 | Karakotsios et al. |
| 8,994,780 B2 | 3/2015 | Moore |
| 9,151,607 B2 | 10/2015 | Davies et al. |
| 9,813,673 B2 | 11/2017 | Smits |
| 2001/0043165 A1 | 11/2001 | Stanton |
| 2002/0036765 A1 | 3/2002 | McCaffrey et al. |
| 2002/0039138 A1 | 4/2002 | Edelson et al. |
| 2002/0040971 A1 | 4/2002 | Ono |
| 2002/0067466 A1 | 6/2002 | Covannon et al. |
| 2002/0100884 A1 | 8/2002 | Maddock |
| 2002/0145588 A1 | 10/2002 | McCahon et al. |
| 2002/0149694 A1 | 10/2002 | Seo |
| 2003/0010888 A1 | 1/2003 | Shimada et al. |
| 2003/0045034 A1 | 3/2003 | Davis et al. |
| 2003/0156260 A1 | 8/2003 | Putilin et al. |
| 2003/0202234 A1 | 10/2003 | Taylor et al. |
| 2003/0202679 A1 | 10/2003 | Rodriguez |
| 2003/0214710 A1 | 11/2003 | Takahashi et al. |
| 2003/0222649 A1 | 12/2003 | Starkweather |
| 2004/0006424 A1 | 1/2004 | Joyce et al. |
| 2004/0054359 A1 | 3/2004 | Ruiz et al. |
| 2004/0114834 A1 | 6/2004 | Fisher |
| 2004/0218155 A1 | 11/2004 | Schenk et al. |
| 2005/0035943 A1 | 2/2005 | Kojima |
| 2005/0052635 A1 | 3/2005 | Xle et al. |
| 2005/0083248 A1 | 4/2005 | Biocca et al. |
| 2005/0099664 A1 | 5/2005 | Yamaoka |
| 2005/0159893 A1 | 7/2005 | Isaji et al. |
| 2005/0195387 A1 | 9/2005 | Zhang et al. |
| 2005/0219530 A1 | 10/2005 | Horibe et al. |
| 2005/0273830 A1 | 12/2005 | Silver et al. |
| 2006/0028374 A1 | 2/2006 | Fullerton |
| 2006/0028622 A1 | 2/2006 | Nojima et al. |
| 2006/0132447 A1 | 6/2006 | Conrad |
| 2006/0132472 A1 | 6/2006 | Peeters et al. |
| 2006/0132729 A1 | 6/2006 | Engle |
| 2006/0197936 A1 | 9/2006 | Liebman |
| 2006/0256133 A1 | 11/2006 | Rosenberg |
| 2007/0046625 A1 | 3/2007 | Yee |
| 2007/0053679 A1 | 3/2007 | Beniyama et al. |
| 2007/0064242 A1 | 3/2007 | Childers |
| 2007/0138371 A1 | 6/2007 | Marshall |
| 2007/0182949 A1 | 8/2007 | Niclass |
| 2007/0273610 A1 | 11/2007 | Baillot |
| 2008/0018591 A1 | 1/2008 | Pittel et al. |
| 2008/0266169 A1 | 10/2008 | Akita |
| 2008/0291213 A1 | 11/2008 | Bhogal |
| 2008/0316026 A1 | 12/2008 | Yenisch et al. |
| 2008/0317077 A1 | 12/2008 | Hoving et al. |
| 2009/0096994 A1 | 4/2009 | Smits |
| 2009/0147239 A1 | 6/2009 | Zhu et al. |
| 2009/0285590 A1 | 11/2009 | Orsley |
| 2010/0002154 A1 | 1/2010 | Hua |
| 2010/0008588 A1 | 1/2010 | Feldkhun et al. |
| 2010/0045967 A1 | 2/2010 | Moir |
| 2010/0142856 A1 | 6/2010 | Takeuchi et al. |
| 2010/0149518 A1 | 6/2010 | Nordenfelt et al. |
| 2011/0001793 A1 | 1/2011 | Moriyama et al. |
| 2011/0123113 A1 | 5/2011 | Berretty et al. |
| 2011/0211243 A1 | 9/2011 | Smits |
| 2011/0249157 A1 | 10/2011 | Fredembach et al. |
| 2011/0304842 A1 | 12/2011 | Kao et al. |
| 2012/0017147 A1 | 1/2012 | Mark |
| 2012/0132713 A1 | 5/2012 | Chaum |
| 2012/0134537 A1 | 5/2012 | Yoon et al. |
| 2012/0140231 A1 | 6/2012 | Knox et al. |
| 2012/0187296 A1 | 7/2012 | Hollander et al. |
| 2012/0224019 A1 | 9/2012 | Samadani et al. |
| 2012/0250152 A1 | 10/2012 | Larson et al. |
| 2012/0274937 A1 | 11/2012 | Hays et al. |
| 2012/0320013 A1 | 12/2012 | Perez et al. |
| 2013/0003081 A1 | 1/2013 | Smits |
| 2013/0021271 A1 | 1/2013 | Guo |
| 2013/0079983 A1 | 3/2013 | Ehilgen et al. |
| 2013/0088465 A1 | 4/2013 | Geller et al. |
| 2013/0170006 A1 | 7/2013 | Kurashige et al. |
| 2013/0176561 A1 | 7/2013 | Hidaka |
| 2013/0215487 A1 | 8/2013 | Konuma et al. |
| 2013/0229669 A1 | 9/2013 | Smits |
| 2013/0239057 A1 | 9/2013 | Ubillos et al. |
| 2013/0300637 A1 | 11/2013 | Smits et al. |
| 2013/0300670 A1 | 11/2013 | Besperstov et al. |
| 2013/0342813 A1 | 12/2013 | Wang |
| 2014/0022539 A1 | 1/2014 | France |
| 2014/0098179 A1 | 4/2014 | Moore |
| 2014/0146243 A1 | 5/2014 | Liu et al. |
| 2014/0176954 A1 | 6/2014 | Scott et al. |
| 2014/0215841 A1 | 8/2014 | Danbury et al. |
| 2014/0267620 A1 | 9/2014 | Bridges |
| 2014/0273752 A1 | 9/2014 | Bajaj et al. |
| 2014/0285818 A1 | 9/2014 | Holz |
| 2014/0307248 A1 | 10/2014 | Giger et al. |
| 2014/0350836 A1* | 11/2014 | Stettner .................. G01S 17/023 701/301 |
| 2015/0009493 A1 | 1/2015 | Kwiatkowski et al. |
| 2015/0066196 A1 | 3/2015 | Wooldridge et al. |
| 2015/0091815 A1 | 4/2015 | Michaelis |
| 2015/0225783 A1 | 8/2015 | Mears et al. |
| 2015/0233703 A1 | 8/2015 | Martini et al. |
| 2015/0279114 A1 | 10/2015 | Yonekubo |
| 2015/0286293 A1 | 10/2015 | Gruhlke et al. |
| 2016/0011312 A1 | 1/2016 | Leyva |
| 2016/0014403 A1 | 1/2016 | Stroetmann |
| 2016/0041266 A1 | 2/2016 | Smits |
| 2016/0050345 A1 | 2/2016 | Longbotham et al. |
| 2016/0259038 A1* | 9/2016 | Retterath .............. G01S 7/4802 |
| 2016/0306044 A1 | 10/2016 | Smits |
| 2016/0335778 A1 | 11/2016 | Smits |

(56) References Cited

U.S. PATENT DOCUMENTS

| | | | |
|---|---|---|---|
| 2017/0131090 A1 | 5/2017 | Bronstein et al. | |
| 2018/0039852 A1 | 2/2018 | Nakumura et al. | |
| 2019/0080612 A1 | 3/2019 | Weissman et al. | |

FOREIGN PATENT DOCUMENTS

| | | | |
|---|---|---|---|
| JP | 2001045381 A | 2/2001 | |
| JP | 2003029201 A | 1/2003 | |
| JP | 2004132914 A | 4/2004 | |
| JP | 2005519338 A | 6/2005 | |
| JP | 2011197674 A | 10/2011 | |
| JP | 2013097138 A | 5/2013 | |
| KR | 10-2011-0115752 A | 10/2011 | |
| KR | 101665938 B1 | 10/2016 | |
| WO | 1992/18971 A1 | 10/1992 | |
| WO | 2000/034818 A1 | 6/2000 | |
| WO | 2006/063577 A1 | 6/2006 | |
| WO | 2009/049272 A2 | 4/2009 | |
| WO | 2011/109402 A2 | 9/2011 | |
| WO | 2012/054231 A2 | 4/2012 | |
| WO | 2014141115 A2 | 9/2014 | |
| WO | 2016033036 A2 | 3/2016 | |

OTHER PUBLICATIONS

Office Communication for U.S. Appl. No. 15/194,502 dated Mar. 6, 2019, pp. 1-11.
Office Communication for U.S. Appl. No. 16/223,043 dated Mar. 14, 2019, pp. 1-46.
Office Communication for U.S. Appl. No. 15/976,269 dated Mar. 25, 2019, pp. 1-49.
Savage, P., "GDC 2013: Valv's Michael Abrash on the challenges of VR—'a new world is emerging'," PCGamer; Apr. 2, 2013, pp. 1-6.
European Search Report for European Patent Application No. 08837063.0 dated Nov. 19, 2010, pp. 1-8.
Communication Pursuant to Article 94(3) EPC in European Patent Application No. 08837063.0 dated Dec. 27, 2011, pp. 1-5.
Communication Pursuant to Article 94(3) EPC in European Patent Application No. 08837063.0 dated Oct. 22, 2012, pp. 1-6.
International Search Report and Written Opinion in International Patent Application No. PCT/US2008/079663 dated Apr. 30, 2009, pp. 1-5.
International Search Report and Written Opinion in International Patent Application No. PCT/US2011/026691 dated Oct. 24, 2011, pp. 1-7.
International Search Report in International Patent Application No. PCT/US2011/054751 dated Jan. 30, 2012, pp. 1.
International Preliminary Report on Patentability in International Patent Application No. PCT/US2008/079663 dated Jan. 25, 2010, pp. 1-11.
International Preliminary Report on Patentability issued in PCT/US2011/026691 dated Sep. 4, 2012, pp. 1-7.
International Preliminary Report on Patentability issued in PCT/US2011/054751 dated Apr. 9, 2013, pp. 1-7.
Official Communication for U.S. Appl. No. 12/249,899 dated Sep. 14, 2011, pp. 1-11.
Official Communication for U.S. Appl. No. 12/249,899 dated Mar. 13, 2012, pp. 1-12.
Official Communication for U.S. Appl. No. 12/249,899 dated Jun. 6, 2012, pp. 1-12.
Official Communication for U.S. Appl. No. 13/037,949 dated Nov. 2, 2012, pp. 1-12.
Official Communication for U.S. Appl. No. 13/037,949 dated Aug. 26, 2013, pp. 1-9.
Official Communication for U.S. Appl. No. 13/605,948 dated Dec. 31, 2012, pp. 1-10.
Official Communication for U.S. Appl. No. 13/858,762 dated Sep. 13, 2013, pp. 1-16.
Official Communication for U.S. Appl. No. 13/877,652 dated Mar. 12, 2015, pp. 1-20.
Official Communication for U.S. Appl. No. 14/046,374 dated Feb. 20, 2014, pp. 1-10.
European Supplementary Search Report for European Patent Application No. 11834848.1 dated Feb. 21, 2014, pp. 1-7.
Official Communication for U.S. Appl. No. 13/858,762 dated Jan. 31, 2014, pp. 1-15.
Official Communication for U.S. Appl. No. 14/048,954 dated Feb. 26, 2014, pp. 1-24.
Official Communication for U.S. Appl. No. 14/048,954 dated Oct. 22, 2014, pp. 1-8.
International Search Report and Written Opinion for application PCT/US2015/023184 dated Jun. 29, 2015, pp. 1-13.
Official Communication for U.S. Appl. No. 13/877,652 dated Aug. 18, 2015, pp. 1-21.
Official Communication for U.S. Appl. No. 14/636,062 dated Sep. 25, 2015, pp. 1-8.
Official Communication for U.S. Appl. No. 14/671,904 dated Sep. 22, 2015, pp. 1-15.
Official Communication for U.S. Appl. No. 14/636,062 dated Jun. 2, 2015, pp. 1-7.
International Search Report and Written Opinion for PCT/US2015/044691 dated Nov. 18, 2015, pp. 1-12.
Official Communication for U.S. Appl. No. 14/823,668 dated Oct. 30, 2015, pp. 1-12.
Official Communication for U.S. Appl. No. 14/636,062 dated Dec. 14, 2015, pp. 1-3.
Official Communication for U.S. Appl. No. 14/823,668 dated Feb. 24, 2016, pp. 1-15.
Official Communication for U.S. Appl. No. 14/671,904 dated Feb. 22, 2016, pp. 1-13.
Official Communication for U.S. Appl. No. 13/877,652 dated Feb. 10, 2016, pp. 1-22.
Official Communication for U.S. Appl. No. 14/636,062 dated Feb. 1, 2016, pp. 1-9.
O'Toole, M., et al., Homogeneous Codes for Energy-Efficient Illumination and Imaging. ACM Transactions on Graphics, 34(4), 35:1-35:13.
Official Communication for U.S. Appl. No. 14/823,668 dated May 18, 2016, pp. 1-10.
Official Communication for U.S. Appl. No. 14/218,643 dated Jun. 23, 2016, pp. 1-11.
Official Communication for U.S. Appl. No. 13/877,652 dated Aug. 12, 2016, pp. 1-22.
Official Communication for U.S. Appl. No. 15/194,502 dated Aug. 19, 2016, pp. 1-12.
Official Communication for U.S. Appl. No. 14/636,062 dated Aug. 24, 2016, pp. 1-9.
International Search Report and Written Opinion for Application PCT/US2016/027386 dated Aug. 26, 2016, pp. 1-10.
Official Communication for U.S. Appl. No. 14/671,904 dated Sep. 28, 2016, pp. 1-14.
Official Communication for U.S. Appl. No. 14/218,643 dated Nov. 1, 2016, pp. 1-10.
Kanzawa, Y., et al., "Human Skin Detection by Visible and Near-infrared Imaging," IAPR Conference on Machine Vision Applications, Jun. 13-15, 2011, Nara Japan, pp. 1-5.
Office Communication for U.S. Appl. No. 13/877,652 dated May 31, 2017, pp. 1-23.
Office Communication for U.S. Appl. No. 15/194,502 dated Mar. 9, 2017, pp. 1-7.
International Search Report and Written Opinion for International Application No. PCT/US2016/067626 dated Mar. 16, 2017, pp. 1-12.
Office Communication for U.S. Appl. No. 14/671,904 dated May 5, 2017, pp. 1-11.
Office Communication for U.S. Appl. No. 15/411,959 dated May 11, 2017, pp. 1-9.
International Search Report and Written Opinion for International Application No. PCT/US2017/014616 dated May 1, 2017, pp. 1-11.
Official Communication for U.S. Appl. No. 15/384,227 dated Feb. 7, 2017, pp. 1-8.
Official Communication for U.S. Appl. No. 15/384,227 dated Jul. 19, 2017, pp. 1-5.

(56) References Cited

OTHER PUBLICATIONS

Official Communication for U.S. Appl. No. 14/671,904 dated Aug. 18, 2017, pp. 1-7.
Official Communication for U.S. Appl. No. 15/194,502 dated Aug. 15, 2017, pp. 1-7.
Official Communication for U.S. Appl. No. 15/411,959 dated Aug. 29, 2017, pp. 1-5.
Official Communication for U.S. Appl. No. 13/877,652 dated Dec. 6, 2017, pp. 1-8.
Official Communication for U.S. Appl. No. 15/799,149 dated Jan. 10, 2018, pp. 1-7.
Official Communication for U.S. Appl. No. 15/444,182 dated Feb. 14, 2018, pp. 1-8.
Official Communication for U.S. Appl. No. 15/194,502 dated Feb. 12, 2018, pp. 1-9.
Official Communication for U.S. Appl. No. 15/804,392 dated Feb. 9, 2018, pp. 1-10.
Official Communication for U.S. Appl. No. 15/804,909 dated Feb. 12, 2018, pp. 1-14.
Official Communication for U.S. Appl. No. 15/098,285 dated Apr. 19, 2018, pp. 1-69.
International Search Report and Written Opinion for International Patent Application No. PCT/US2017/068377 dated Apr. 17, 2018, pp. 1-12.
Office Communication for U.S. Appl. No. 15/411,959 dated May 11, 2017, pp. 1-8.
Office Communication for U.S. Appl. No. 15/694,532 dated Jul. 10, 2018, pp. 1-45.
Office Communication for U.S. Appl. No. 15/804,392 dated Jun. 6, 2018, pp. 1-6.
Office Communication for U.S. Appl. No. 15/194,502 dated Jun. 11, 2018, pp. 1-13.
Office Communication for U.S. Appl. No. 15/804,909 dated Jul. 5, 2018, pp. 1-12.
Office Communication for U.S. Appl. No. 15/799,149 dated Jun. 20, 2018, pp. 1-7.
Office Communication for U.S. Appl. No. 15/853,783 dated Aug. 15, 2018, pp. 1-49.
International Search Report and Written Opinion for International Patent Application No. PCT/US2017/059282 dated Aug. 10, 2018, pp. 1-10.
Office Communication for U.S. Appl. No. 15/444,182 dated Sep. 13, 2018, pp. 1-11.
Office Communication for U.S. Appl. No. 16/049,380 dated Sep. 27, 2018, pp. 1-40.
International Search Report and Written Opinion in International Patent Application No. PCT/US18/32078 dated Nov. 16, 2018; pp. 1-16.
Office Communication for U.S. Appl. No. 16/140,485 dated Nov. 23, 2018, pp. 1-58.
Office Communication for U.S. Appl. No. 15/194,502 dated Jan. 3, 2019, pp. 1-15.
Office Communication for U.S. Appl. No. 15/694,532 dated Jan. 17, 2019, pp. 1-9.
Office Communication for U.S. Appl. No. 15/853,783 dated Jan. 24, 2019, pp. 1-36.
Office Communication for U.S. Appl. No. 16/165,631 dated Apr. 1, 2019, pp. 1-23.

* cited by examiner

Side view

Sub pixel resolution

HYPER-RESOLVED, HIGH BANDWIDTH SCANNED LIDAR SYSTEMS

CROSS-REFERENCE TO RELATED APPLICATION

This application is a Utility Patent application based on previously filed U.S. Provisional Patent Application U.S. Ser. No. 62/709,715 filed on Jan. 29, 2018, the benefit of the filing date of which is hereby claimed under 35 U.S.C. § 119(e) and which is further incorporated in entirety by reference.

TECHNICAL FIELD

The present invention relates generally to a light imaging, detection and ranging (LIDAR) system and to methods of making and using the LIDAR system. The present invention is also directed to a LIDAR system that scans with a narrow blade of illumination across a field of view with an array of pixels.

BACKGROUND

LIDAR systems may be employed to determine a range, a distance, a position and/or a trajectory of a remote object, such as an aircraft, a missile, a drone, a projectile, a baseball, a vehicle, or the like. The systems may track the remote object based on detection of photons, or other signals, emitted and/or reflected by the remote object. LIDAR systems may illuminate the remote object with electromagnetic waves, or light beams, emitted by the systems. The systems may detect a portion of light beams that are reflected, or scattered, by the remote object. The systems may suffer from one or more of undesirable speed, undesirable accuracy, or undesirable susceptibility to noise.

DESCRIPTION OF EMBODIMENTS OF THE INVENTION

Figure 1:
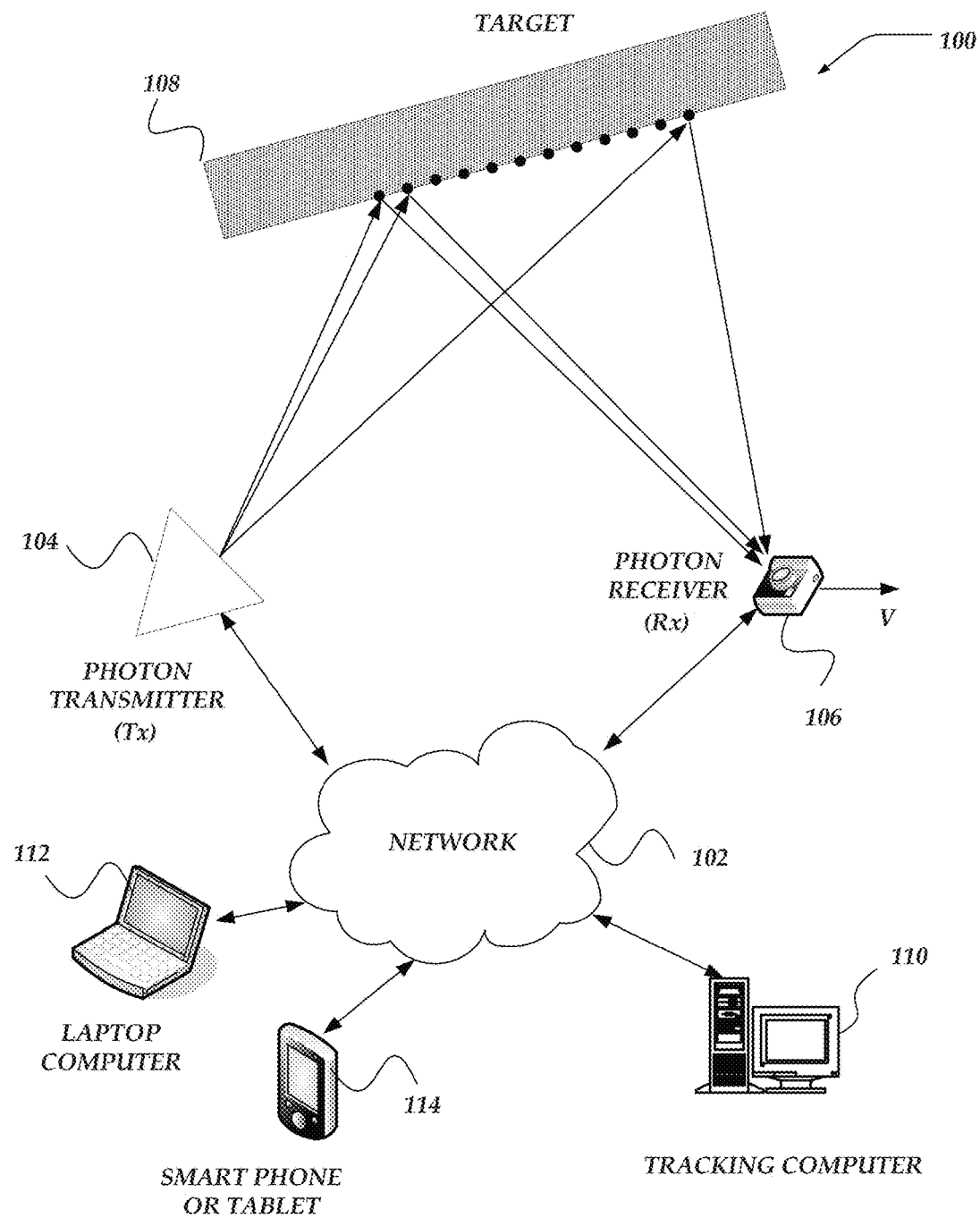
FIG. 1 shows an embodiment of an exemplary environment in which various embodiments of the invention may be implemented.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" conjunction, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "photon beam," "light beam," "electromagnetic beam," "image beam," or "beam" refer to a somewhat localized (in time and space) beam or bundle of photons or electromagnetic (EM) waves of various frequencies or wavelengths within the EM spectrum. An outgoing light beam is a beam that is transmitted by various ones of the various embodiments disclosed herein. An incoming light beam is a beam that is detected by various ones of the various embodiments disclosed herein.

As used herein, the terms "light source," "photon source," or "source" refer to various devices that are capable of emitting, providing, transmitting, or generating one or more photons or EM waves of one or more wavelengths or frequencies within the EM spectrum. A light or photon source may transmit one or more outgoing light beams. A photon source may be a laser, a light emitting diode (LED), a light bulb, or the like. A photon source may generate photons via stimulated emissions of atoms or molecules, an incandescent process, or various other mechanism that generates an EM wave or one or more photons. A photon source may provide continuous or pulsed outgoing light beams of a predetermined frequency, or range of frequencies. The outgoing light beams may be coherent light beams. The photons emitted by a light source may be of various wavelengths or frequencies.

As used herein, the terms "photon detector," "light detector," "detector," "photon sensor," "light sensor," or "sensor" refer to various devices that are sensitive to the presence of one or more photons of one or more wavelengths or frequencies of the EM spectrum. A photon detector may include an array of photon detectors, such as an arrangement of a plurality of photon detecting or sensing pixels. One or more of the pixels may be a photosensor that is sensitive to the absorption of at least one photon. A photon detector may generate a signal in response to the absorption of one or more photons. A photon detector may include a one-dimensional (1D) array of pixels. However, in other embodiments, photon detector may include at least a two-dimensional (2D) array of pixels. The pixels may include various photon-sensitive technologies, such as one or more of active-pixel sensors (APS), charge-coupled devices (CCDs), Single Photon Avalanche Detector (SPAD) (operated in avalanche mode or Geiger mode), photovoltaic cells, phototransistors, twitchy pixels, or the like. A photon detector may detect one or more incoming light beams.

As used herein, the term "target" is one or more various 2D or 3D bodies that reflect or scatter at least a portion of incident light, EM waves, or photons. For instance, a target may scatter or reflect an outgoing light beam that is transmitted by various ones of the various embodiments disclosed herein. In the various embodiments described herein, one or more photon sources may be in relative motion to one or more of photon detectors and/or one or more targets. Similarly, one or more photon detectors may be in relative motion to one or more of photon sources and/or one or more targets. One or more targets may be in relative motion to one or more of photon sources and/or one or more photon detectors.

As used herein, the term "disparity" represents a positional offset of one or more pixels in a sensor relative to a predetermined position in the sensor. For example, horizontal and vertical disparities of a given pixel in a sensor may represent horizontal and vertical offsets (e.g., as indicated by row or column number, units of distance, or the like) of the given pixel from a predetermined position in the sensor (or another sensor). The disparities may be measured from a center, one or more edges, one or more other pixels, or the like in the sensor (or another sensor). In other embodiments, disparity may represent an angle. For example, a transmitter may emit a beam at an angle $\alpha$, and the sensor may receive a reflection of the beam at an angle $\beta$ through an aperture. The disparity may be measured as the difference between 180° and the sum of the angles $\alpha$ and $\beta$.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are generally directed to a scanning LIDAR system that measures a distance to a target that reflects light from a transmitter to a receiver. A light transmitter is arranged to scan pulses of light that reflect off a remote surface (target) and illuminate fractions of the Field of View (FoV) of a receiver, such as a camera. These fractions of the FoV are smaller than a resolution provided by an array of pixels used to detect Time of Flight (ToF) reflections of the scanned pulses of light from a remote surface. The exemplary scanning LIDAR system may resolve an image of the remote surface at substantially higher resolution than the pixel resolution provided by its receiver. And such a "hyper-resolved" scanning LIDAR system is capable of 3-dimensional (3D) image accuracies that are equivalent to 2-dimensional (2D) high resolution passive camera system, such as employed in machine vision cameras.

In one or more embodiments, the receiver may be co-located with the transmitter. In one or more embodiments, the pixels may be silicon photomultiplier (SiPM) pixels which can detect single photons. Also, in one or more embodiments, each arrival time of a photon pulse is captured by the receiver and transferred to a system bus, which can be configured to simultaneously communicate a full row or column of signals provided by the pixels.

In one or more embodiments, the transmitter scans a known trajectory (F(t)) across the FoV. Also, when pulsed laser illumination is emitted, the instantaneous direction may be observed by a feedback loop. Further, during each scan across the FoV, the transmitter pulses laser illumination in particular intervals in transmission directions that match receiving directions of rows or columns of a receiver. For example, N pulses, in N (x and $\beta$) directions matching N pixel rows or columns.

In one or more embodiments, during successive scans by the transmitter, the timing of the laser pulses is advanced in fractional increments. Further, each increment is correlated to a fractional shift in direction within the perspective of the same receiving ToF pixel, i.e. incremental fractions within the telescopic view of a ToF pixel.

In one or more embodiments, rows or columns of ToF pixels in an array of the receiver are activated in a "rolling-shutter" fashion to match expected direction of the reflected laser pulses. For example, M incremental positions within the telescopic view of a single row or column of pixels resolve M sub pixel positions. Also, the resolution along the direction of a scan may be M times higher than the number of receivers (e.g. if N=400, 400 columns, and M=10, then 4000 lateral positions are scanned, resulting in a 4K resolution LIDAR system).

In one or more embodiments, a light transmitter is arranged to scan pulses of laser light emanating from a slot aperture and collimated by cylindrical optics to form a blade (thin and wide) of light that illuminate fractions of the Field of View (FoV) of a receiver, and are smaller than the pixel resolution of an array of pixels used to detect Time of Flight (ToF) reflections of the scanned pulses of light from a remote surface. For example, a slot (slit) aperture may be an exit facet of a laser diode, e.g., 1 by 20 microns. A laser "blade" is formed by one dimensional optics, such as a cylindrical lens after the slit. Also, in one or more embodiments, a blade of laser light illumination may be "serrated" into S individual tips, and the tips can be moved incrementally during successive scans along the blade (e.g. vertical) direction so that the dimension traversed in the scan direction may also be "hyper-resolved." Further, surface details of objects that are encountered during successively scanned frames of an image can be "filled" in, with higher degrees of surface structure detail being provided during successive scans.

In one or more embodiments, two blades of laser light may be arranged to scan the FoV in two orthogonal directions, so that each single photon avalanche diode (SPAD) arranged in two dimensions for an array of pixels can be hyper resolved. One blade may scan horizontally along an X axis (i.e. an azimuthal scan, across various columns in the array of pixels) and the second blade may scan vertically along a Y axis (across the elevations—corresponding to rows in the array of pixels).

In one or more embodiments, the exemplary LIDAR system may compute and build a rigid surface shape hypothesis, and/or a 3D trajectory hypothesis. Further, the computation of these hypotheses may use a form of "Spatiotemporal Histogramming" or of "dithered over-sampling" using a "canonical 3D surface" model (estimator).

In one or more embodiments, an active area of SPAD based pixels is smaller than the total pixel, i.e. the pitch (spacing) between adjacent pixels. Micro-lenses can expand the active area to effectively illuminate the whole of the pixel, so that any photons falling at any place in the array may be detected.

Although high definition (HD) camera based navigational systems may resolve features at 1/60th of a degree to match the ability of human foveal vision. A blue laser blade illuminated hyper scanning LIDAR system, may provide scanning speeds in excess of 4 thousand frames per second, over a succession of 10 frames, to resolve two thousand horizontal pixels (2K) for displaying an image in three dimensions and also match each observed voxel with each camera pixel of the same resolution. For example, at 4000 frames per second, ten successive frames advancing 1/10 across 400 columns would effectively provide exact voxel positions and pixel color contrast down to 0.01 degree in the scan direction. This level of resolution is able to accurately observe a world in constant motion. Also, individual positions of voxels may be observed with sub microsecond latency and temporal accuracy. Further, four thousand horizontal (4K) pixel hyper resolved frames of an image may be observed at 400 frames per second or more. Also, 4K hyper resolved 3D color images may be provided with 250-microseconds of latency, or less.

Illustrated Operating Environment

FIG. 1 shows exemplary components of one embodiment of an exemplary environment in which various exemplary embodiments of the invention may be practiced. Not all of the components may be required to practice the invention, and variations in the arrangement and type of the components may be made without departing from the spirit or scope of the invention. As shown, system 100 of FIG. 1 includes network 102, photon transmitter 104, photon receiver 106, target 108, and tracking computer device 110. In some embodiments, system 100 may include one or more other computers, such as but not limited to laptop computer 112 and/or mobile computer, such as but not limited to a smartphone or tablet 114. In some embodiments, photon transmitter 104 and/or photon receiver 106 may include one or more components included in a computer, such as but not limited to various ones of computers 110, 112, or 114.

Additionally, photon transmitter 104 may unidirectionally scan laser light to generate a blade of light illumination that is much wider than its thickness. Also, the photon receiver may provide an array of pixels in two dimensions to receive the reflection of the blade from a surface of a remote object.

System 100, as well as other systems discussed herein, may be a sequential-pixel photon projection system. In at least one embodiment system 100 is a sequential-pixel laser projection system that includes visible and/or non-visible photon sources. Various embodiments of such systems are described in detail in at least U.S. Pat. Nos. 8,282,222, 8,430,512, 8,696,141, 8,711,370, U.S. Patent Publication No. 2013/0300,637, and U.S. Patent Publication No. 2016/0041266. Note that each of the U.S. patents and U.S. patent publications listed above are herein incorporated by reference in the entirety.

Target 108 may be a two-dimensional or three-dimensional target. Target 108 is not an idealized black body, i.e. it reflects or scatters at least a portion of incident photons. As shown by the velocity vector associated with photon receiver 106, in some embodiments, photon receiver 106 is in relative motion to at least one of photon transmitter 104 and/or target 108. For the embodiment of FIG. 1, photon transmitter 104 and target 108 are stationary with respect to one another. However, in other embodiments, photon transmitter 104 and target 108 are in relative motion. In at least one embodiment, photon receiver 106 may be stationary with respect to one or more of photon transmitter 104 and/or target 108. Accordingly, each of photon transmitter 104, target 108, and photon receiver 106 may be stationary or in relative motion to various other ones of photon transmitter 104, target 108, and photon receiver 106. Furthermore, as used herein, the term "motion" may refer to translational motion along one or more of three orthogonal special dimensions and/or rotational motion about one or more corresponding rotational axis.

Photon transmitter 104 is described in more detail below. Briefly, however, photon transmitter 104 may include one or more photon sources for transmitting light or photon beams in a scanned blade (width is greater than thickness) of pulsed laser light illumination. A photon source may include photodiodes. A photon source may provide continuous or pulsed light beams of a predetermined frequency, or range of frequencies. The provided light beams may be coherent light beams. A photon source may be a laser. For instance, photon transmitter 104 may include one or more visible and/or non-visible laser source. In one embodiment, photon transmitter 104 includes at least one of a red (R), a green (G), and a blue (B) laser source to produce an RGB image. In some embodiments, photon transmitter includes at least one non-visible laser source, such as a near-infrared (NIR) laser. Photon transmitter 104 may be a projector. Photon transmitter 104 may include various ones of the features, components, or functionality of a computer device, including but not limited to mobile computer 200 of FIG. 2 and/or network computer 300 of FIG. 3.

Photon transmitter 104 also includes an optical system that includes optical components to direct, focus, and scan the transmitted or outgoing blade of light beams. The optical systems aim and shape the spatial and temporal beam profiles of outgoing light beam blades. The optical system may collimate, fan-out, or otherwise manipulate the outgoing light beams. At least a portion of the outgoing light beams are aimed at and are reflected by the target 108. In at least one embodiment, photon transmitter 104 includes one or more photon detectors for detecting incoming photons reflected from target 108, e.g., transmitter 104 is a transceiver.

Photon receiver 106 is described in more detail below. Briefly, however, photon receiver 106 may include one or more photon-sensitive, or photon-detecting, arrays of sensor pixels. An array of sensor pixels detects continuous or pulsed light beams reflected from target 108. The array of pixels may be a one dimensional-array or a two-dimensional array. The pixels may include SPAD pixels or other photo-sensitive elements that avalanche upon the illumination by one or a few incoming photons. The pixels may have ultra-fast response times of a few nanoseconds in detecting a single or a few photons. The pixels may be sensitive to the frequencies emitted or transmitted by photon transmitter 104 and relatively insensitive to other frequencies. Photon receiver 106 also includes an optical system that includes optical components to direct, focus, and scan the received, or incoming, beams, across the array of pixels. In at least one embodiment, photon receiver 106 includes one or more photon sources for emitting photons toward the target 108 (e.g., receiver 106 includes a transceiver). Photon receiver 106 may include a camera. Photon receiver 106 may include various ones of the features, components, or functionality of a computer device, including but not limited to mobile computer 200 of FIG. 2 and/or network computer 300 of FIG. 3.

Various embodiment of tracking computer device 110 are described in more detail below in conjunction with FIGS. 2-3 (e.g., tracking computer device 110 may be an embodiment of mobile computer 200 of FIG. 2 and/or network computer 300 of FIG. 3). Briefly, however, tracking computer device 110 includes virtually various computer devices enabled to perform the various tracking processes and/or methods discussed herein, based on the detection of photons reflected from one or more surfaces, including but not limited to surfaces of target 108. Based on the detected photons or light beams, tracking computer device 110 may alter or otherwise modify one or more configurations of photon transmitter 104 and photon receiver 106. It should be understood that the functionality of tracking computer device 110 may be performed by photon transmitter 104, photon receiver 106, or a combination thereof, without communicating to a separate device.

In some embodiments, at least some of the tracking functionality may be performed by other computers, including but not limited to laptop computer 112 and/or a mobile computer, such as but not limited to a smartphone or tablet 114. Various embodiments of such computers are described in more detail below in conjunction with mobile computer 200 of FIG. 2 and/or network computer 300 of FIG. 3.

Network 102 may be configured to couple network computers with other computing devices, including photon transmitter 104, photon receiver 106, tracking computer device 110, laptop computer 112, or smartphone/tablet 114. Network 102 may include various wired and/or wireless technologies for communicating with a remote device, such as, but not limited to, USB cable, Bluetooth®, Wi-Fi®, or the like. In some embodiments, network 102 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 102 may be enabled to employ various forms of communication technology, topology, computer-readable media, or the like, for communicating information from one electronic device to another. For example, network 102 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 102 may include various communication technologies by which information may travel between computing devices.

Network 102 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer (e.g., laptop computer 112 or smart phone or tablet computer 114) (or other mobile devices). Such sub-networks may include mesh networks, Wireless LAN (WLAN) networks, cellular networks, or the like. In at least one of the various embodiments, the system may include more than one wireless network.

Network 102 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between photon transmitter 104, photon receiver 106, and tracking computer device 110, as well as other computing devices not illustrated.

In various embodiments, at least a portion of network 102 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

As discussed in detail below, photon transmitter 104 may provide an optical beacon signal. Accordingly, photon transmitter 104 may include a transmitter (Tx). Photon transmitter 104 may transmit a photon beam onto a projection surface of target 108. Thus, photon transmitter 104 may transmit and/or project an image onto the target 108. The image may include a sequential pixilation pattern. The discreet pixels shown on the surface of target 108 indicate the sequential scanning of pixels of the image via sequential scanning performed by photon transmitter 108. Photon receiver (Rx) 106 may include an observing system which receives the reflected image. As noted, photon receiver 106 may be in motion relative (as noted by the velocity vector) to the image being projected. The relative motion between photon receiver 106 and each of the photon transmitter 104 and target 108 may include a relative velocity in various directions and an arbitrary amplitude. In system 100, photon transmitter 104 and the image on the surface are not in relative motion. Rather, the image is held steady on the surface of target 108. However, other embodiments are not so constrained (e.g., the photon transmitter 104 may be in relative motion to target 108). The projected image may be anchored on the surface by compensating for the relative motion between the photon transmitter 104 and the target 108.

Illustrative Mobile Computer

Figure 2:
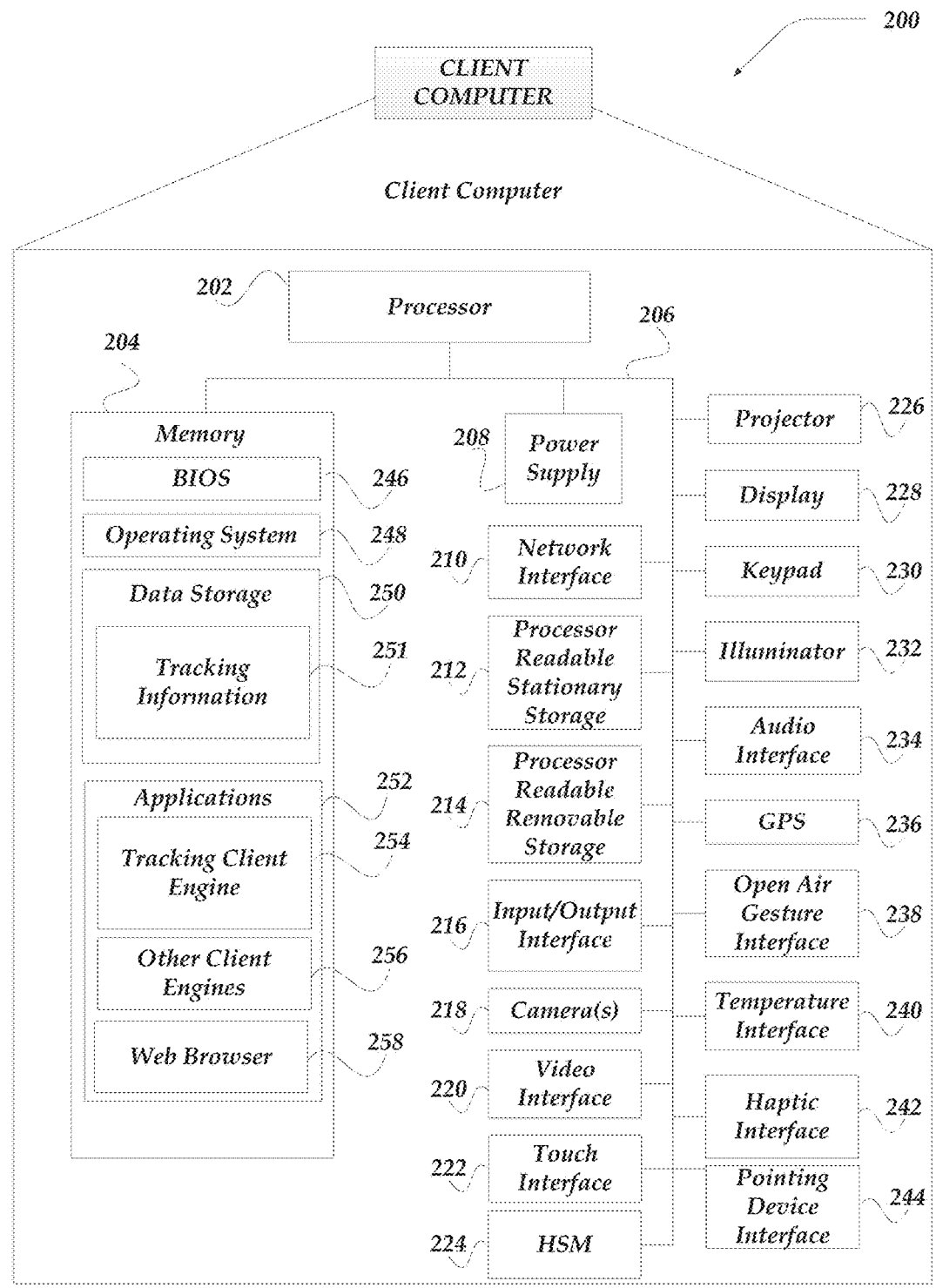
FIG. 2 illustrates an embodiment of an exemplary mobile computer that may be included in a system such as that shown in FIG. 1.

FIG. 2 shows one embodiment of an exemplary mobile computer 200 that may include many more or less components than those exemplary components shown. Mobile computer 200 may represent, for example, at least one embodiment of laptop computer 112, smartphone/tablet 114, and/or tracking computer 110 of system 100 of FIG. 1. Thus, mobile computer 200 may include a mobile device (e.g., a smart phone or tablet), a stationary/desktop computer, or the like.

Client computer 200 may include processor 202 in communication with memory 204 via bus 206. Client computer 200 may also include power supply 208, network interface 210, processor-readable stationary storage device 212, processor-readable removable storage device 214, input/output interface 216, camera(s) 218, video interface 220, touch interface 222, hardware security module (HSM) 224, projector 226, display 228, keypad 230, illuminator 232, audio interface 234, global positioning systems (GPS) transceiver 236, open air gesture interface 238, temperature interface 240, haptic interface 242, and pointing device interface 244. Client computer 200 may optionally communicate with a base station (not shown), or directly with another computer. And in one embodiment, although not shown, a gyroscope may be employed within client computer 200 for measuring and/or maintaining an orientation of client computer 200.

Power supply 208 may provide power to client computer 200. A rechargeable or non-rechargeable battery may be used to provide power. The power may also be provided by an external power source, such as an AC adapter or a powered docking cradle that supplements and/or recharges the battery.

Network interface 210 includes circuitry for coupling client computer 200 to one or more networks, and is constructed for use with one or more communication protocols and technologies including, but not limited to, protocols and technologies that implement various portions of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or various ones of a variety of other wireless communication protocols. Network interface 210 is sometimes known as a transceiver, transceiving device, or network interface card (NIC).

Audio interface 234 may be arranged to produce and receive audio signals such as the sound of a human voice. For example, audio interface 234 may be coupled to a speaker and microphone (not shown) to enable telecommunication with others and/or generate an audio acknowledgement for some action. A microphone in audio interface 234 can also be used for input to or control of client computer 200, e.g., using voice recognition, detecting touch based on sound, and the like.

Display 228 may be a liquid crystal display (LCD), gas plasma, electronic ink, light emitting diode (LED), Organic LED (OLED) or various other types of light reflective or light transmissive displays that can be used with a computer. Display 228 may also include the touch interface 222 arranged to receive input from an object such as a stylus or a digit from a human hand, and may use resistive, capacitive, surface acoustic wave (SAW), infrared, radar, or other technologies to sense touch and/or gestures.

Projector 226 may be a remote handheld projector or an integrated projector that is capable of projecting an image on a remote wall or various other reflective objects such as a remote screen.

Video interface 220 may be arranged to capture video images, such as a still photo, a video segment, an infrared video, or the like. For example, video interface 220 may be coupled to a digital video camera, a web-camera, or the like. Video interface 220 may comprise a lens, an image sensor, and other electronics. Image sensors may include a complementary metal-oxide-semiconductor (CMOS) integrated circuit, charge-coupled device (CCD), or various other integrated circuits for sensing light.

Keypad 230 may comprise various input devices arranged to receive input from a user. For example, keypad 230 may include a push button numeric dial, or a keyboard. Keypad 230 may also include command buttons that are associated with selecting and sending images.

Illuminator 232 may provide a status indication and/or provide light. Illuminator 232 may remain active for specific periods of time or in response to event messages. For example, if illuminator 232 is active, it may backlight the buttons on keypad 230 and stay on while the client computer is powered. Also, illuminator 232 may backlight these buttons in various patterns if particular actions are performed, such as dialing another client computer. Illuminator 232 may also cause light sources positioned within a transparent or translucent case of the client computer to illuminate in response to actions.

Further, client computer 200 may also comprise HSM 224 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 224 may be a stand-alone computer, in other cases, HSM 224 may be arranged as a hardware card that may be added to a client computer.

Client computer 200 may also comprise input/output interface 216 for communicating with external peripheral devices or other computers such as other client computers and network computers. The peripheral devices may include an audio headset, virtual reality headsets, display screen glasses, remote speaker system, remote speaker and microphone system, and the like. Input/output interface 216 can utilize one or more technologies, such as Universal Serial Bus (USB), Infrared, Wi-Fi™, WiMax, Bluetooth™, and the like.

Input/output interface 216 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to client computer 200.

Haptic interface 242 may be arranged to provide tactile feedback to a user of the client computer. For example, the haptic interface 242 may be employed to vibrate client computer 200 in a particular way if another user of a computer is calling. Temperature interface 240 may be used to provide a temperature measurement input and/or a temperature changing output to a user of client computer 200. Open air gesture interface 238 may sense physical gestures of a user of client computer 200, for example, by using single or stereo video cameras, radar, a gyroscopic sensor inside a computer held or worn by the user, or the like. Camera 218 may be used to track physical eye movements of a user of client computer 200.

GPS transceiver 236 can determine the physical coordinates of client computer 200 on the surface of the Earth, which typically outputs a location as latitude and longitude values. GPS transceiver 236 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 236 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 228 or keypad 230 can instead be routed through network interface 210 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 246 for controlling low-level operation of client computer 200. The memory may also store operating system 248 for controlling the operation of client computer 200. It will be appreciated that this component may include a general-purpose operating system such as a version of UNIX, or LINUX™ or a specialized client computer communication operating system such as Apple iOS®, or the Android® operating system. The operating system may include, or interface with a Java virtual machine module that enables control of hardware components and/or operating system operations via Java application programs.

Memory 204 may further include one or more data storage 250, which can be utilized by client computer 200 to store, among other things, applications 252 and/or other data. For example, data storage 250 may also be employed to store information that describes various capabilities of client computer 200. In one or more of the various embodiments, data storage 250 may store tracking information 251. The information 251 may then be provided to another device or computer based on various ones of a variety of methods, including being sent as part of a header during a communication, sent upon request, or the like. Data storage 250 may also be employed to store social networking information including address books, buddy lists, aliases, user profile information, or the like. Data storage 250 may further include program code, data, algorithms, and the like, for use by a processor, such as processor 202 to execute and perform actions. In one embodiment, at least some of data storage 250 might also be stored on another component of client computer 200, including, but not limited to, non-transitory processor-readable stationary storage device 212, processor-readable removable storage device 214, or even external to the client computer.

Applications 252 may include computer executable instructions which, if executed by client computer 200, transmit, receive, and/or otherwise process instructions and data. Applications 252 may include, for example, tracking client engine 254, other client engines 256, web browser 258, or the like. Client computers may be arranged to exchange communications, such as, queries, searches, messages, notification messages, event messages, alerts, performance metrics, log data, API calls, or the like, combination thereof, with application servers, network file system applications, and/or storage management applications.

The web browser engine 226 may be configured to receive and to send web pages, web-based messages, graphics, text, multimedia, and the like. The client computer's browser engine 226 may employ virtually various programming languages, including a wireless application protocol messages (WAP), and the like. In one or more embodiments, the browser engine 258 is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include a hardware microcontroller instead of a CPU. In one or more embodiments, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
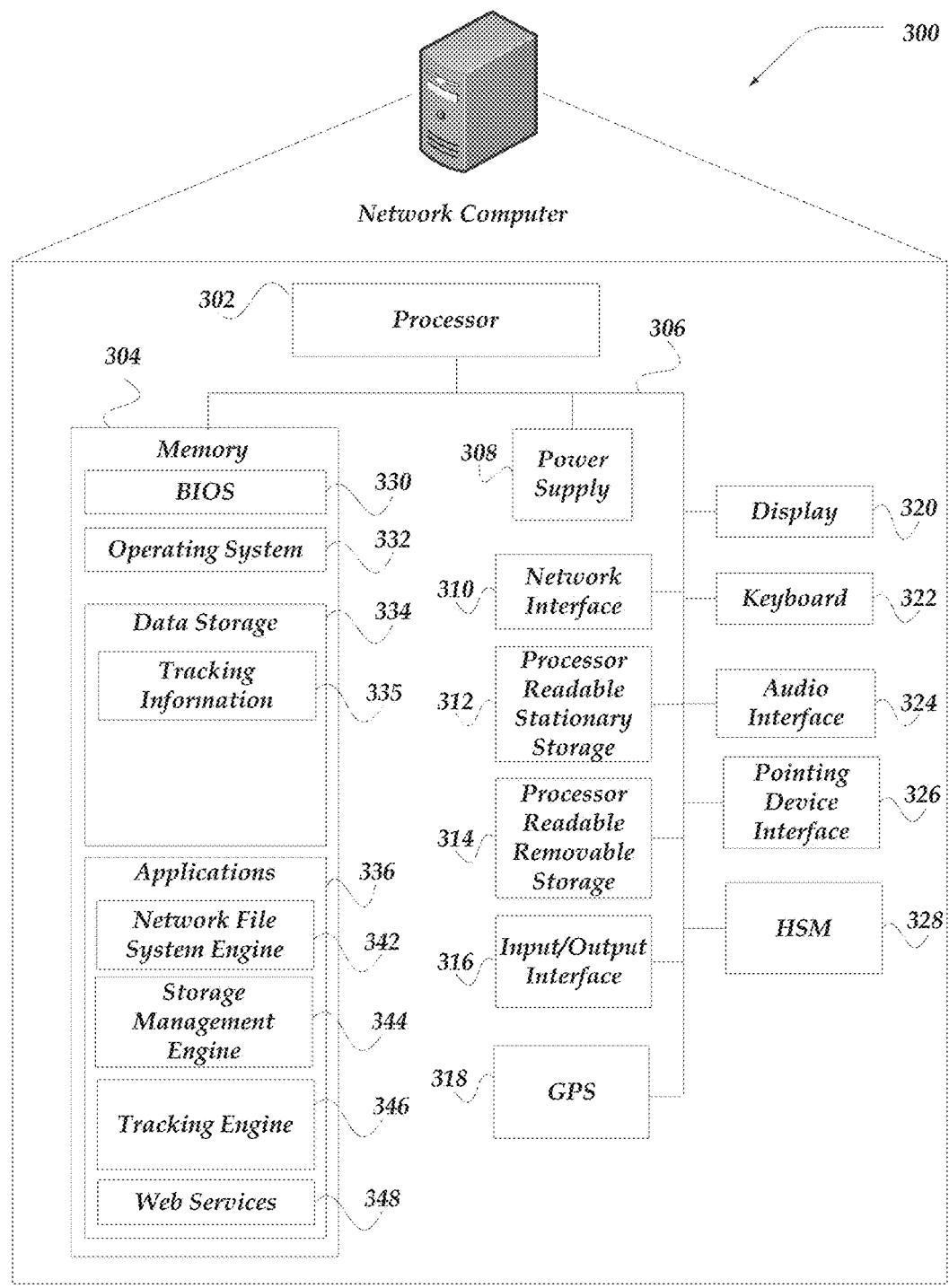
FIG. 3 shows an embodiment of an exemplary network computer that may be included in a system such as that shown in FIG. 1.

FIG. 3 shows one embodiment of an exemplary network computer 300 that may be included in an exemplary system implementing one or more of the various embodiments. Network computer 300 may include many more or less components than those shown in FIG. 3. However, the components shown are sufficient to disclose an illustrative embodiment for practicing these innovations. Network computer 300 may include a desktop computer, a laptop computer, a server computer, a client computer, and the like. Network computer 300 may represent, for example, one embodiment of one or more of laptop computer 112, smartphone/tablet 114, and/or tracking computer 110 of system 100 of FIG. 1.

As shown in FIG. 3, network computer 300 includes a processor 302 that may be in communication with a memory 304 via a bus 306. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 308, network interface 310, processor-readable stationary storage device 312, processor-readable removable storage device 314, input/output interface 316, GPS transceiver 318, display 320, keyboard 322, audio interface 324, pointing device interface 326, and HSM 328. Power supply 308 provides power to network computer 300.

Network interface 310 includes circuitry for coupling network computer 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MIMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Network computer 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of network computer 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Network computer 300 may also comprise input/output interface 316 for communicating with external devices or computers not shown in FIG. 3. Input/output interface 316 can utilize one or more wired or wireless communication technologies, such as USB™, Firewire™, Wi-Fi™ WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to network computer 300. Human interface components can be physically separate from network computer 300, allowing for remote input and/or output to network computer 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

GPS transceiver 318 can determine the physical coordinates of network computer 300 on the surface of the Earth, which typically outputs a location as latitude and longitude values. GPS transceiver 318 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 318 can determine a physical location for network computer 300. In one or more embodiments, however, network computer 300 may, through other components, provide other information that may be employed to determine a physical location of the client computer, including for example, a Media Access Control (MAC) address, IP address, and the like.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of network computer 300. The memory also stores an operating system 332 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by network computer 300 to store, among other things, applications 336 and/or other data. For example, data storage 334 may also be employed to store information that describes various capabilities of network computer 300. In one or more of the various embodiments, data storage 334 may store tracking information 335. The tracking information 335 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of network computer 300, including, but not limited to, non-transitory media inside non-transitory processor-readable stationary storage device 312, processor-readable removable storage device 314, or various other computer-readable storage devices within network computer 300, or even external to network computer 300.

Applications 336 may include computer executable instructions which, if executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include tracking engine 346 that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, tracking engine 346 may be operative in a cloud-based computing environment. In one or more of the various embodiments, these applications, and others, may be executing within virtual machines and/or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines and/or virtual servers dedicated to tracking engine 346 may be provisioned and de-commissioned automatically.

Also, in one or more of the various embodiments, tracking engine 346 or the like may be located in virtual servers running in a cloud-based computing environment rather than being tied to one or more specific physical network computers.

Further, network computer 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 328 may be a stand-alone network computer, in other cases, HSM 328 may be arranged as a hardware card that may be installed in a network computer.

Additionally, in one or more embodiments (not shown in the figures), the network computer may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

Illustrative System Operation and Architecture

Figure 4:
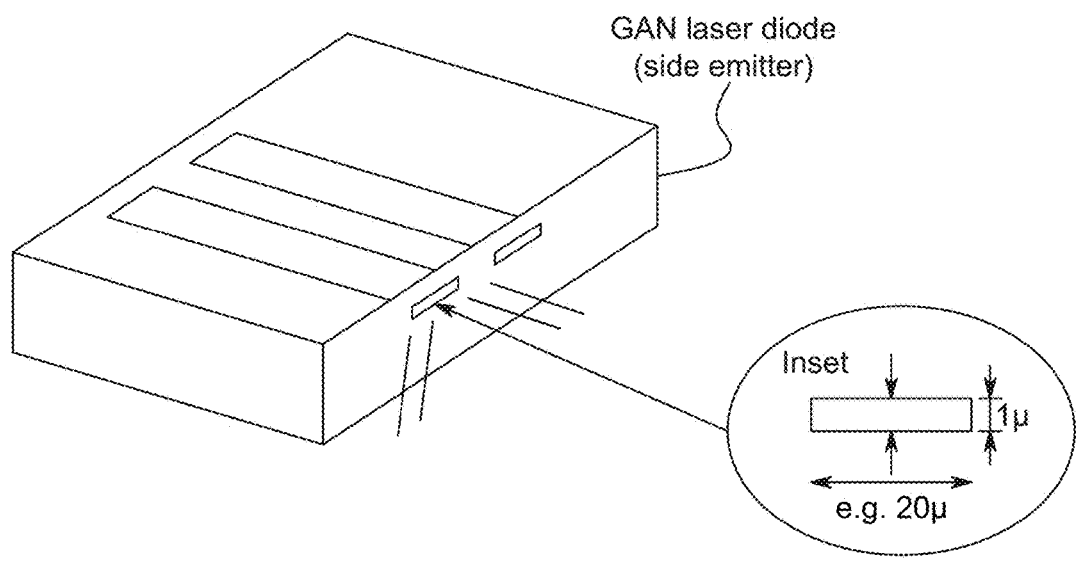
FIG. 4 shows a perspective view of a light source that is configured as an exemplary laser diode bar device to emit laser light on its edge as a "light blade" through a thin and wide aperture.

FIG. 4 shows a perspective view of a light source that is configured as an exemplary laser diode bar device to emit laser light on its edge as a "light blade" through a thin and wide aperture. As shown, an edge-emitting GaN diode laser is emitting blue (405 nm) laser light from apertures or "facets" on the edge of the device. Each emitter has a "thin and wide" aperture from which coherent blue laser light is emitted. In one or more embodiments, the aperture may be only 1 micron thin and as much as 20-micron wide. The light emitted from across the thin dimension (here shown vertical) spreads (diverges) across a wide angle and may be referred to as "the fast axis".

Figure 5A:
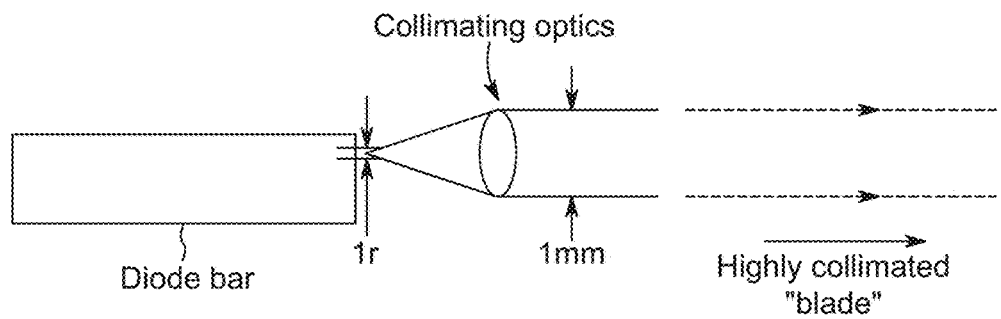
FIG. 5A illustrates a side view of the laser diode bar device collimating the laser light into a beam along one axis, i.e., a "light blade"
Figure 5B:
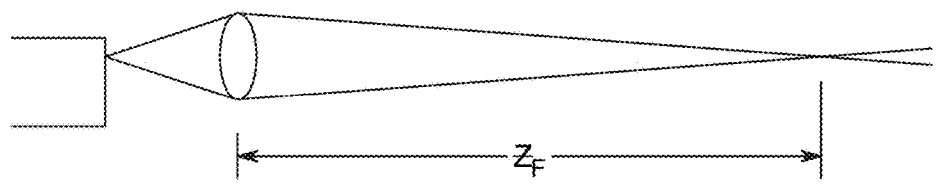
FIG. 5B shows another side view of the exemplary laser diode bar device where the maximum sharpness of the light blade is set at a fixed distance by a position of a collimating lens.

FIG. 5A illustrates a side view of the laser diode bar device collimating the laser light into a beam along one axis, i.e., a "light blade." Also, FIG. 5B shows another side view of the exemplary laser diode bar device where the maximum sharpness of the light blade is set at a fixed distance by a position of a collimating lens. In one or more embodiments, at least because the emission window (facet) is so narrow, the fast axis emission (typically single mode resonance) can be collimated into a highly collimated beam. Since the laser light may be collimated in just one axis, the laser light ends up as a "light blade" that projects a sharp thin line on a remote surface or across a remote object. The blade can be purely collimated, projecting sharp lines in the far field, across a large range. (See FIG. 5A) Or, alternatively, the maximum sharpness of the laser light scan line may be set at a certain distance by slightly focusing in the emissions from the laser diode bar. For example, adjusting the focal distance slightly by moving the bar or the collimating lens. A varifocal projection focus is set at distance Zf in FIG. 5B.

Figure 6:
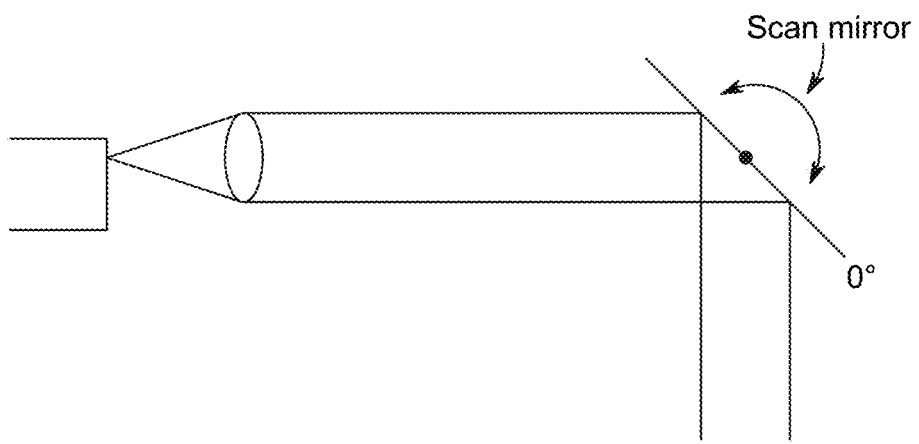
FIG. 6 illustrates an exemplary scan mirror that unidirectionally sweeps the laser "light blade" back and forth across the field of view (FoV)
Figure 6:
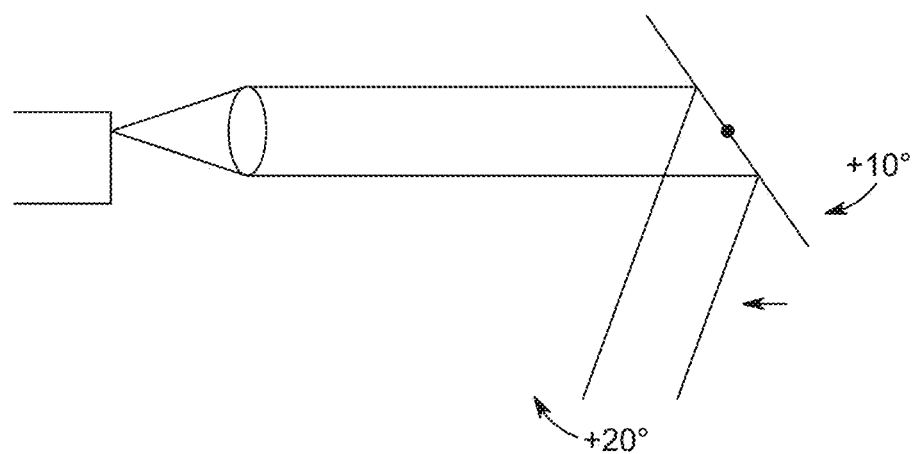
Figure 6:
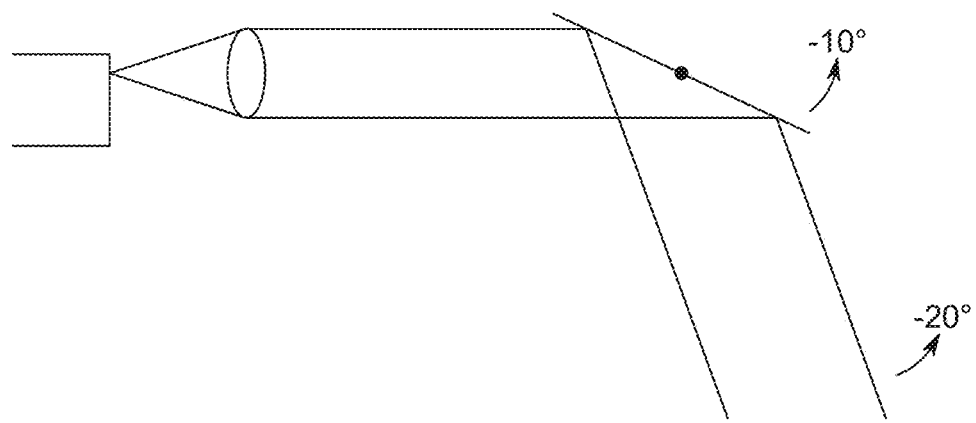

FIG. 6 illustrates an exemplary scan mirror that unidirectionally sweeps the laser "light blade" back and forth across the field of view (FoV). As shown, a scan mirror moves the "light blade" with a uni-axial mirror, e.g., a galvo-mirror or microelectromechanical systems (MEMS) mirror to scan the collimated "light blade" back and forth across a field of view (FoV). In one or more embodiments, the sweep angle may be twice a mechanical angle: if e.g. a MEMS mirror moves +/−10 degrees, it will move (rotate) the "light blade" +/−20 degrees, over a total angle of 40 degrees, across the FoV.

Figure 7:
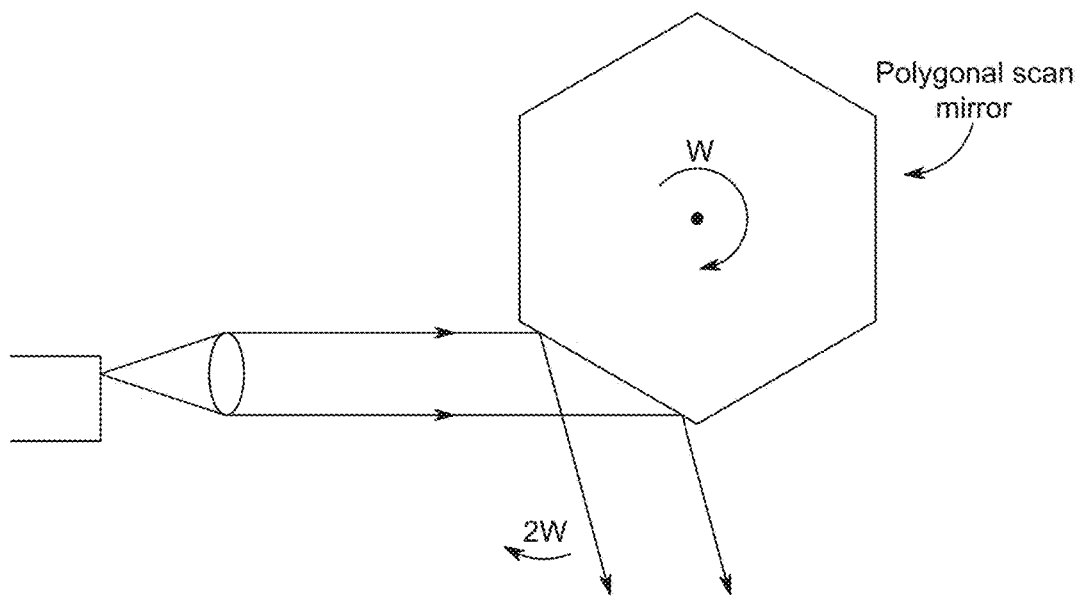
FIG. 7 shows an exemplary polygonal shaped rotating mirror sweeping the laser light blade uni-directionally across a FoV.

FIG. 7 shows an exemplary polygonal shaped rotating mirror sweeping the laser light blade uni-directionally across a FoV. At 100 revolutions per second (6000 rpm) a polygonal mirror with 18 facets may sweep the blade 1800 times per second across a 40 degree FoV.

Figure 8:
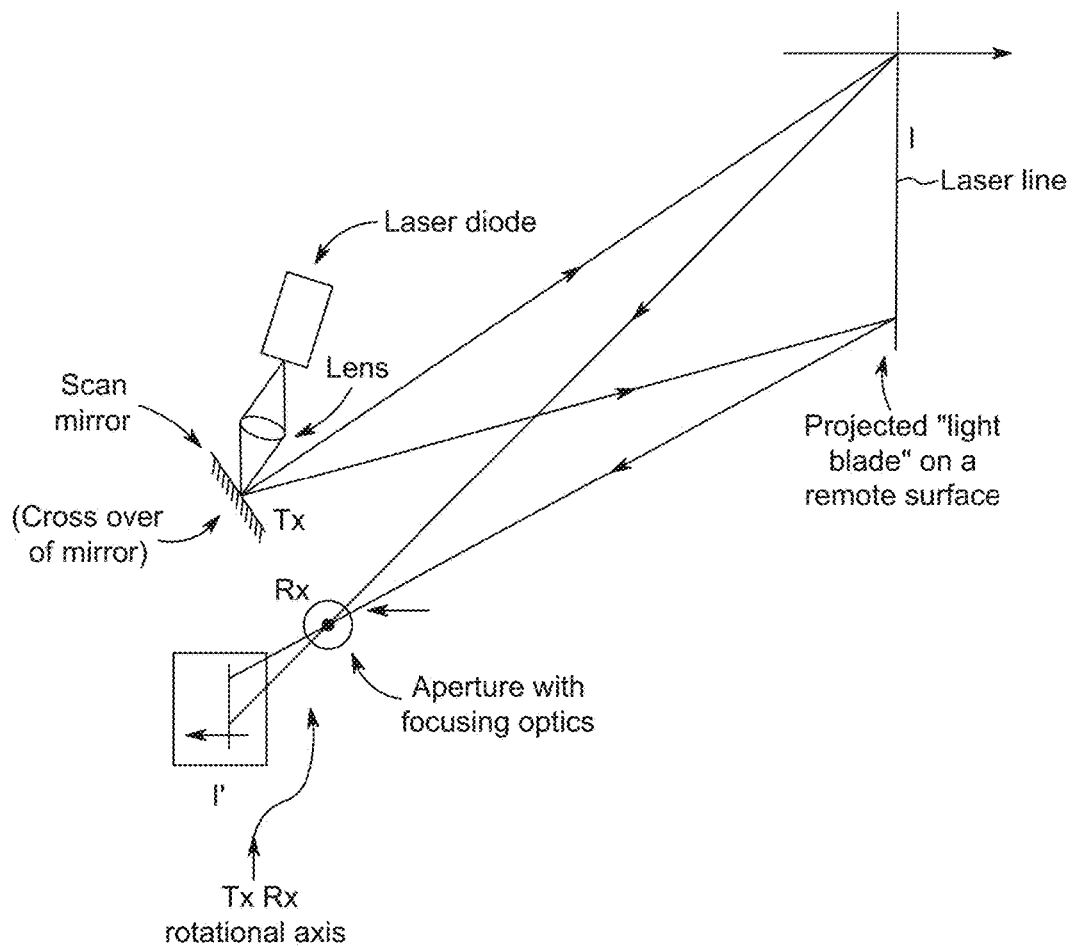
FIG. 8 illustrates an exemplary system that provides for transmitting (Tx) and receiving (Rx) a laser light blade scanned onto and reflected back from a remote surface.

FIG. 8 illustrates an exemplary LIDAR system that provides for transmitting (Tx) and receiving (Rx) a laser light blade scanned onto and reflected back from a remote surface. The transmitter (Tx) emits the "light blade", scanning it and projecting a sharp line on a remote surface. A receiver is shown here with an aperture for the focusing optics located along (aligned with) the same rotational axis along which the transmitter (Tx) is scanning the light blade. One may be mounted above the other (aligned on the same vertical axis). The receiver (Rx) may include an aperture with focusing optics that projects the reflection of the laser line 1 onto the surface of an array sensor S.

Figure 9:
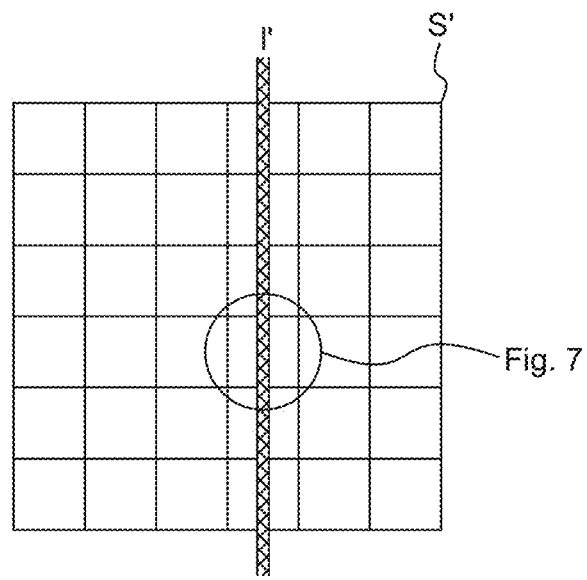
FIG. 9 shows an exemplary projected image (I') of the laser light blade onto a surface of an exemplary pixel array sensor (S)

FIG. 9 shows an exemplary projected image (I') of the laser light blade onto a surface of an exemplary pixel array sensor (S) of which just a small portion is shown in the figure.

Figure 10:
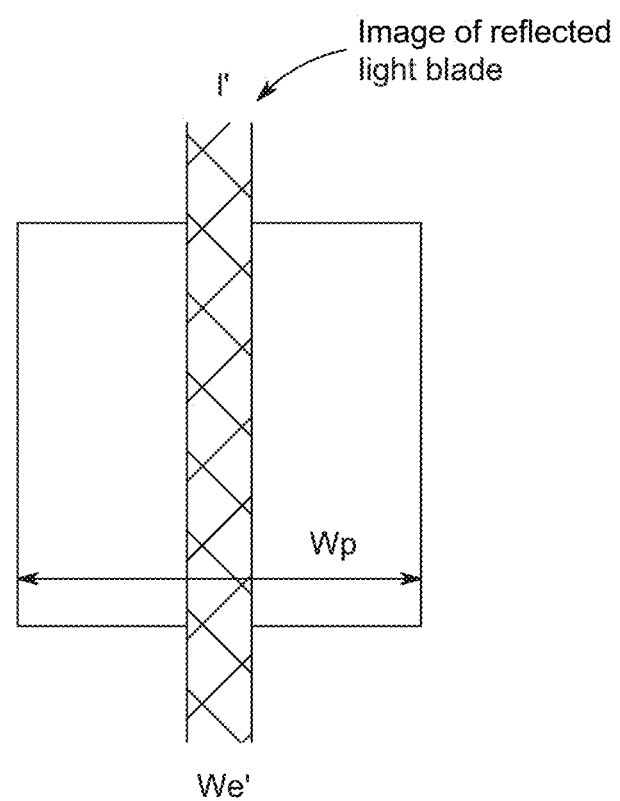
FIG. 10 illustrates an exemplary projected image (I') of the laser light blade's line width (Wl') being substantially narrower than the width of a pixel in the array (Wp)

FIG. 10 illustrates an exemplary projected image (I') of the laser light blade's line width (WI') being substantially narrower than the width of a pixel in the array (Wp), or WI'<<Wp.

Figure 11:
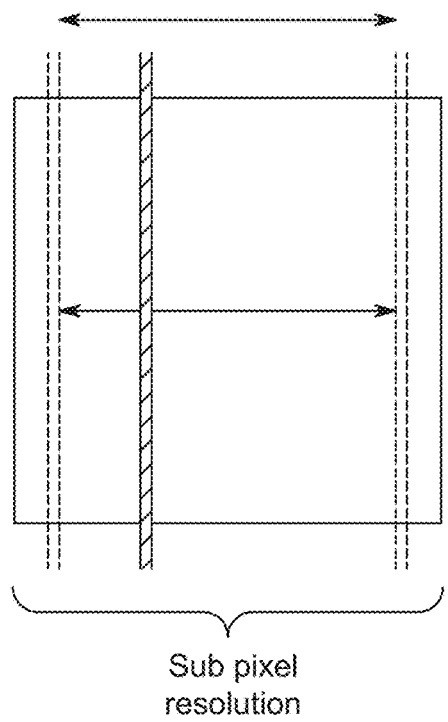
FIG. 11 shows exemplary successive scans where a position of the projected image (I') of the laser light blade is advanced, or retarded by small fractions, in correspondence to the projected image (I') illuminating slightly different fractional portions of a 3D surface in the FoV.

FIG. 11 shows exemplary successive scans where a position of the projected image (I') of the laser light blade is advanced, or retarded by small fractions, in correspondence to the projected image (I') illuminating slightly different fractional portions of a 3D surface in the FoV. In one or more embodiments, the 3D position and degree of reflectivity (i.e. albedo and or color variances across the surface) of these surfaces can be resolved in the scan direction substantially beyond the pixel resolution of the sensor, as well as the focusing ability of the receiver Rx.

Figure 12:
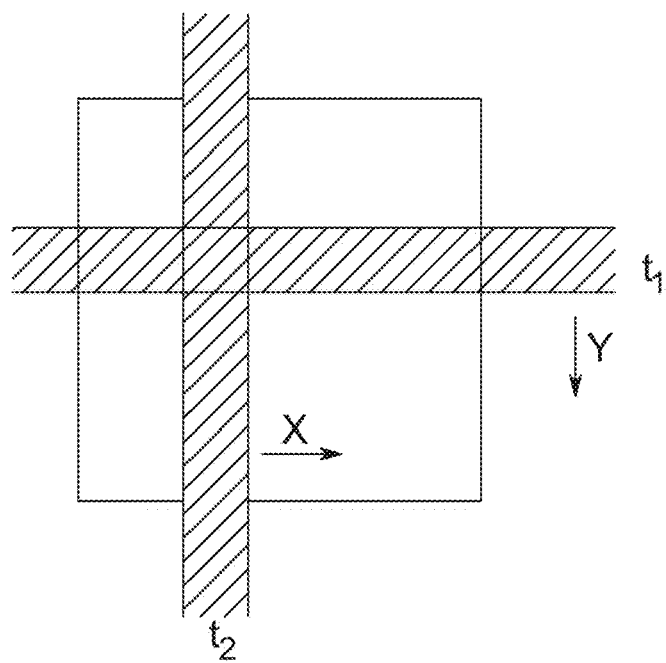
FIG. 12 illustrates actions of an exemplary hyper-resolved 3D LIDAR system that employs separate transmitting (Tx) processes to separately scan a pixel in both the x (column) and β (row) directions.

FIG. 12 illustrates actions of an exemplary hyper-resolved 3D LIDAR system that employs separate transmitting (Tx) processes to separately scan a pixel in both the x (column) and y (row) directions, at separate times t2 and t1 respectively.

Figure 13:
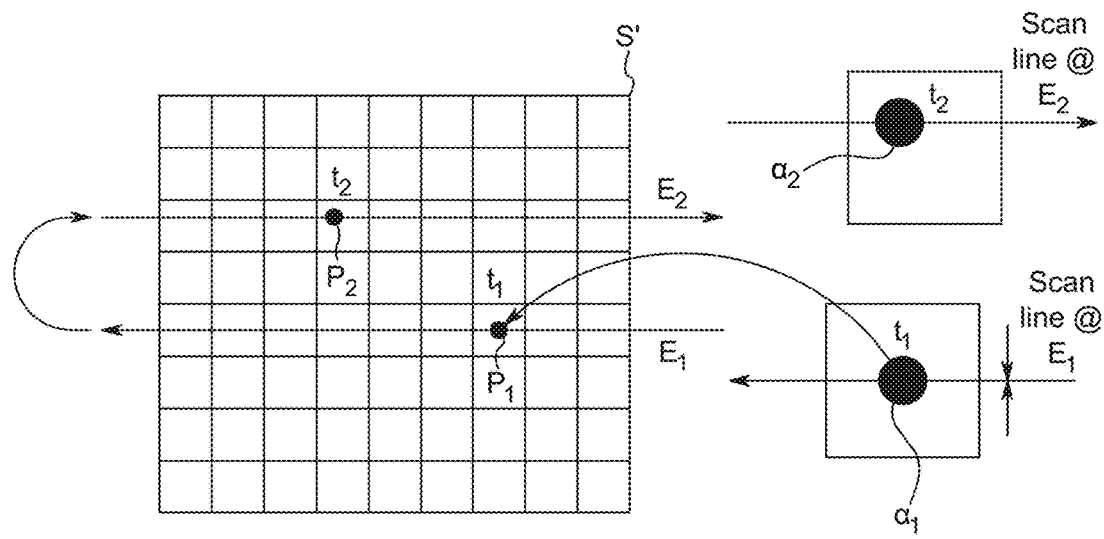
FIG. 13 shows an exemplary 2D array LIDAR system that scans the projected image of a laser light spot in a 2D pattern that is reflected off a surface onto pixels in an array.

FIG. 13 shows an exemplary 2D super resolution array LIDAR system that scans the projected image (I') of the laser light blade in a 2D pattern that is reflected off a surface onto pixels in an array. (Other embodiments are discussed herein that scan in a 1D trajectory). The 2D scan may be an output of a gimbal type MEMS mirror scanning transmitter (Tx). As shown, the laser line is reflected off a surface and observed by the receiver (Rx). Shown here is a portion of an array sensor S, where the laser point sequential trajectory scans first across one row of pixels in the sensor. This row of pixels corresponds to an elevation—a scan height Y—of epsilon 1 (E1). At time t1, the laser point illuminates a point P1 in the sensor. At a later time the scan line traverses another row of pixels in the array S, corresponding to an elevation epsilon 2 (E2), at time t2 the reflection of the beam t2 illuminates point P2 in that row. The beam and spot trajectory is continuous and smooth, and known either by direct feedback on the beam motion, e.g., by tracking MEMS mirror positions, or by indirect feedback derived from the reflected spot observation (e.g. spatio-temporal interpolation between avalanche diode events in a SiPM sensor). Thus, a precise spot position can be established ex-post from a series of prior observations and each moment at which the laser fires can be correlated (matched) with the elevation and azimuth directions (the 2D pointing directions) in the transmitter (Tx). Thus, each position of the illuminated voxel can be deducted, with a higher degree of precision than the mere resolution of a pixelated SPAD array.

Figure 14:
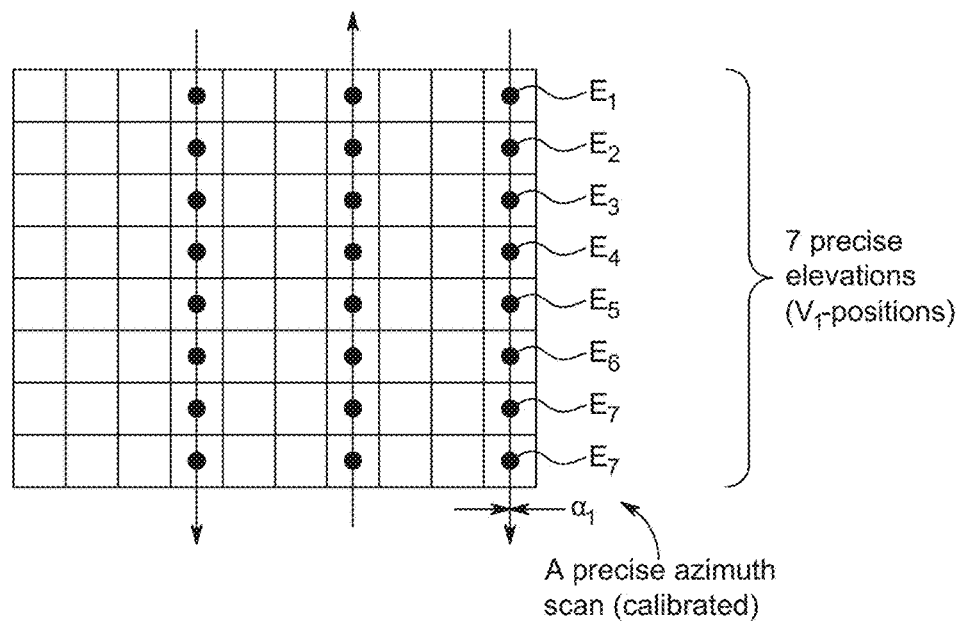
FIG. 14 illustrates an exemplary 2D LIDAR system that scans the projected image of the laser light spot in columns where the azimuthal position of each of the columns may be established through feedback and/or calibration.

FIG. 14 illustrates an exemplary 2D point scan LIDAR system that scans the projected image (I') of the laser light blade in columns where the azimuthal position of each of the columns may be established through feedback and/or calibration. The 2D LIDAR system provides the fast scan direction along the columns in an SiPM array. 3 columns are scanned in this illustration. The azimuthal position of each of the columns can be established through feedback and/or calibration. In each of the 3 columns, in each of 7 rows the laser light illuminates momentarily, e.g., for 1 nano second during an approximate 10 nanoseconds for successive transition of an individual pixel. The exact elevations (epsilon 1-7) in each column are likewise determined by feedback and calibration. Also, in FIGS. 13 and 14, the transmitters (Tx) and receivers (Rx) are generally collocated (e.g., the mirror position of the scanner in the transmitter and the optical center of the aperture of the receiver are substantially aligned).

Figure 15:
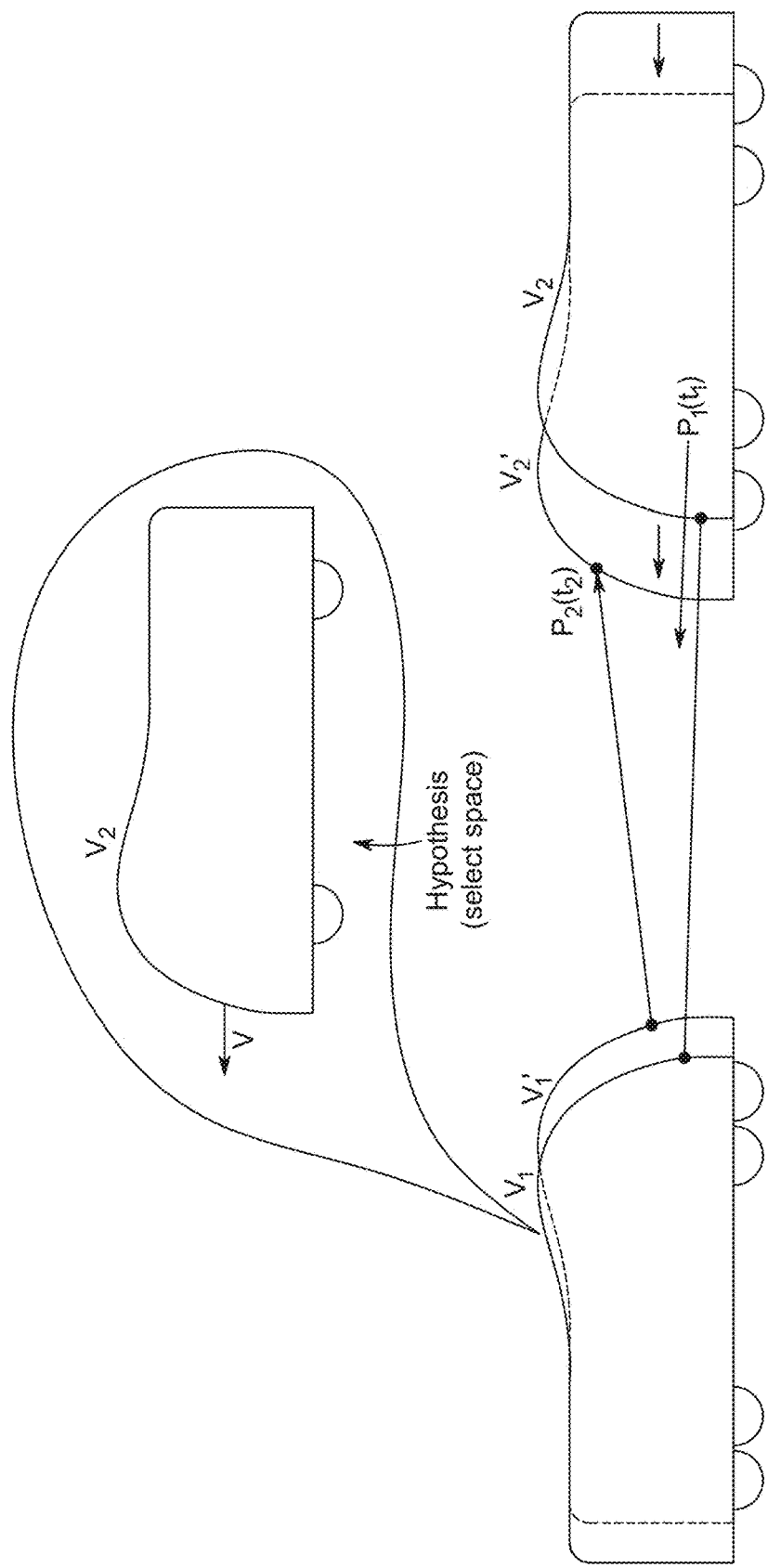
FIG. 15 shows an exemplary overview of two vehicles that are quickly approaching each other and a hyper resolved LIDAR system is able to quickly observe small changes in distance between the vehicles.

FIG. 15 shows an exemplary overview of a use case for the exemplary LIDAR systems discussed above. In this example, two vehicles are quickly approaching each other, and a hyper resolved LIDAR system is employed by one vehicle to quickly observe small changes in distance between each other. As shown, Vehicle one (V1) LIDAR discovers a voxel P1 at t1 on the surface of vehicle 2 (V2). In a later scanline—e.g. a few 100 microseconds later—a second voxel P2 is observed, at a closer distance, because the distance between the two vehicles has substantially changed even during the short, elapsed interval. This illustrates how fast hyper resolved LIDAR systems which produce a constant stream of nanosecond accurate observations may be optimized by directing their "raw" data streams (Mega voxels flows) into an Artificial Intelligence (AI) compute system that can find (detect, locate, classify and track) moving objects and surfaces in a "big data" cloud, a highly oversampled voxel flow. Sorting through large, dense low latency flows of voxel and pixel data is preferable over a simpler LIDAR approach which ("histogramming") tries to refine individual LIDAR point observations PRIOR to passing the refined (cleaned up, histogrammed) data on to a machine perception system. As shown, vehicle V1's machine perception system develops a working hypothesis about the nature and position, and velocity of the approaching vehicle V2.

Using this working hypothesis for the 3D shape and 6 degrees of freedom (position velocity, heading with respect to a world reference and/or its own position and heading) the machine perception system can "fit" successive further observations to refine both the 3d image details of the perceived objects, and its observed and predicted motion trajectory, e.g to help improve classification and making necessary navigation decisions e.g. to avoid a collision.

Figure 17A:
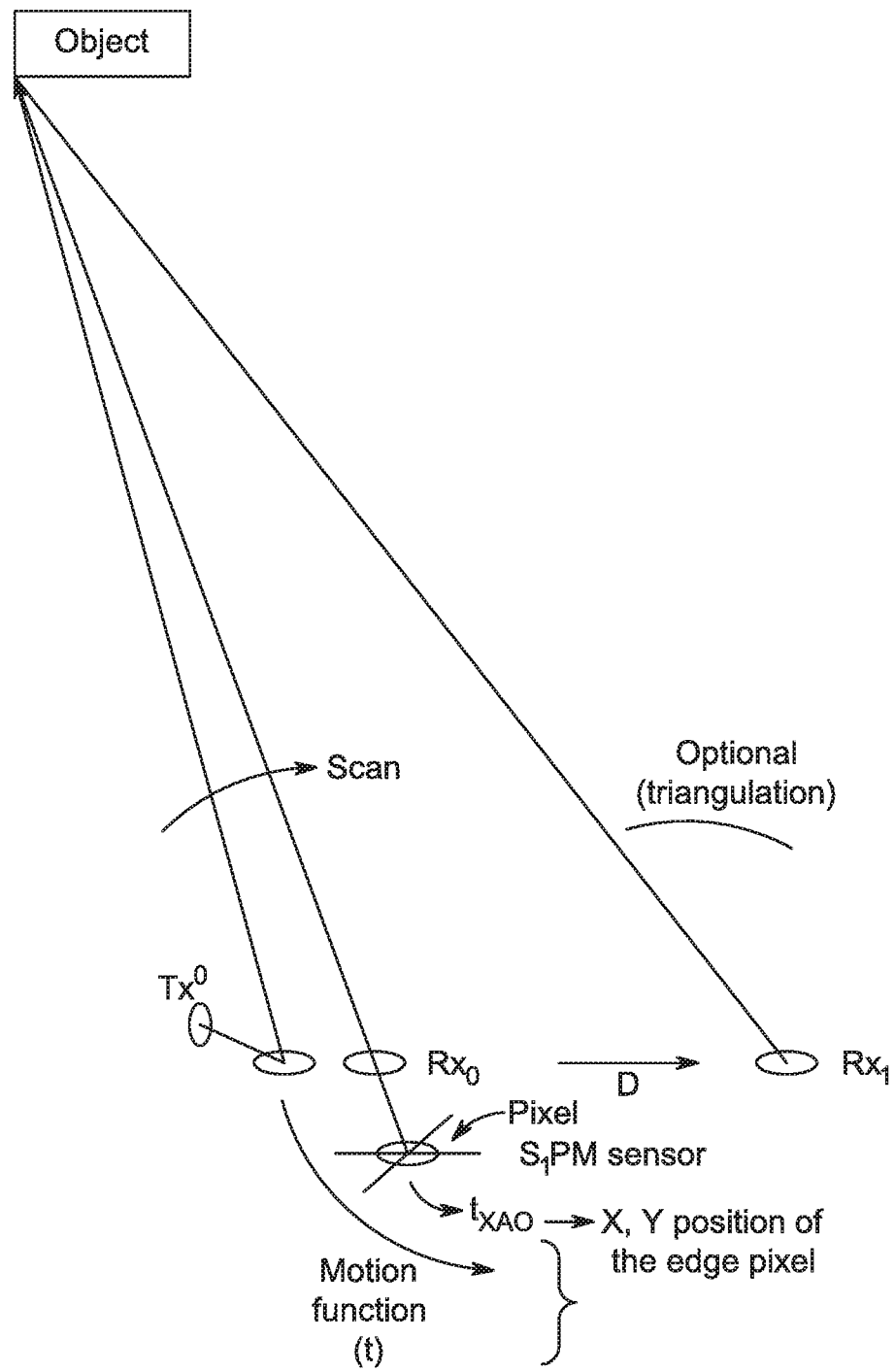
FIG. 17A shows an exemplary LIDAR system detecting a first edge of an object.

FIG. 17A shows an exemplary LIDAR system detecting a first edge of a target object.

Figure 17B:
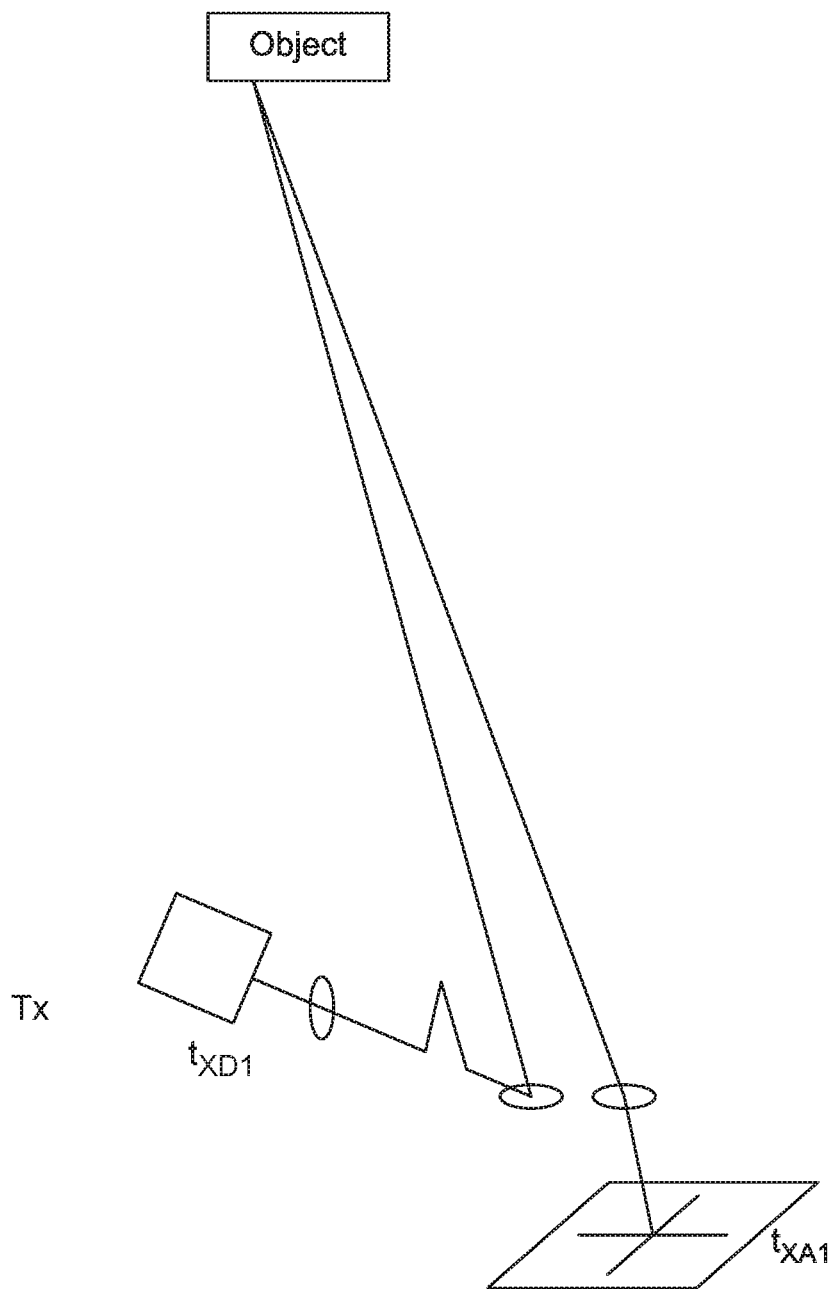
FIG. 17B illustrates an exemplary LIDAR system that is emitting scanned light pulses at a detected object.

FIG. 17B illustrates an exemplary LIDAR system that has switched from scanning continuous light to scanning light pulses when a target object is detected.

Figure 17C:
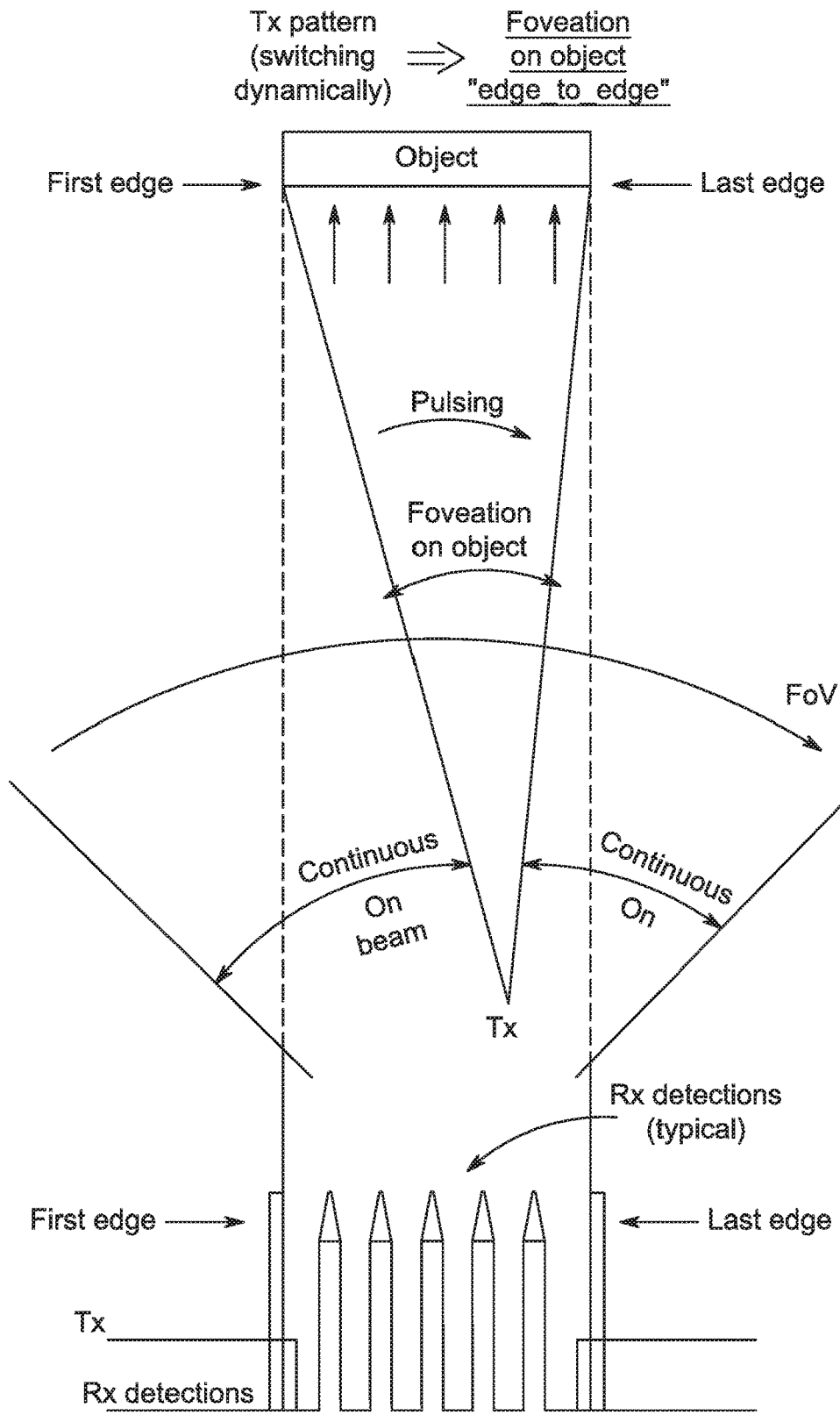
FIG. 17C shows an exemplary LIDAR system scanning pulsed light when an object is detected and scanning continuous light when the object is undetected.

FIG. 17C shows an exemplary LIDAR system scanning pulsed light when a target object is detected and scanning continuous light when a target object is undetected.

Generalized Operations

Figure 16:
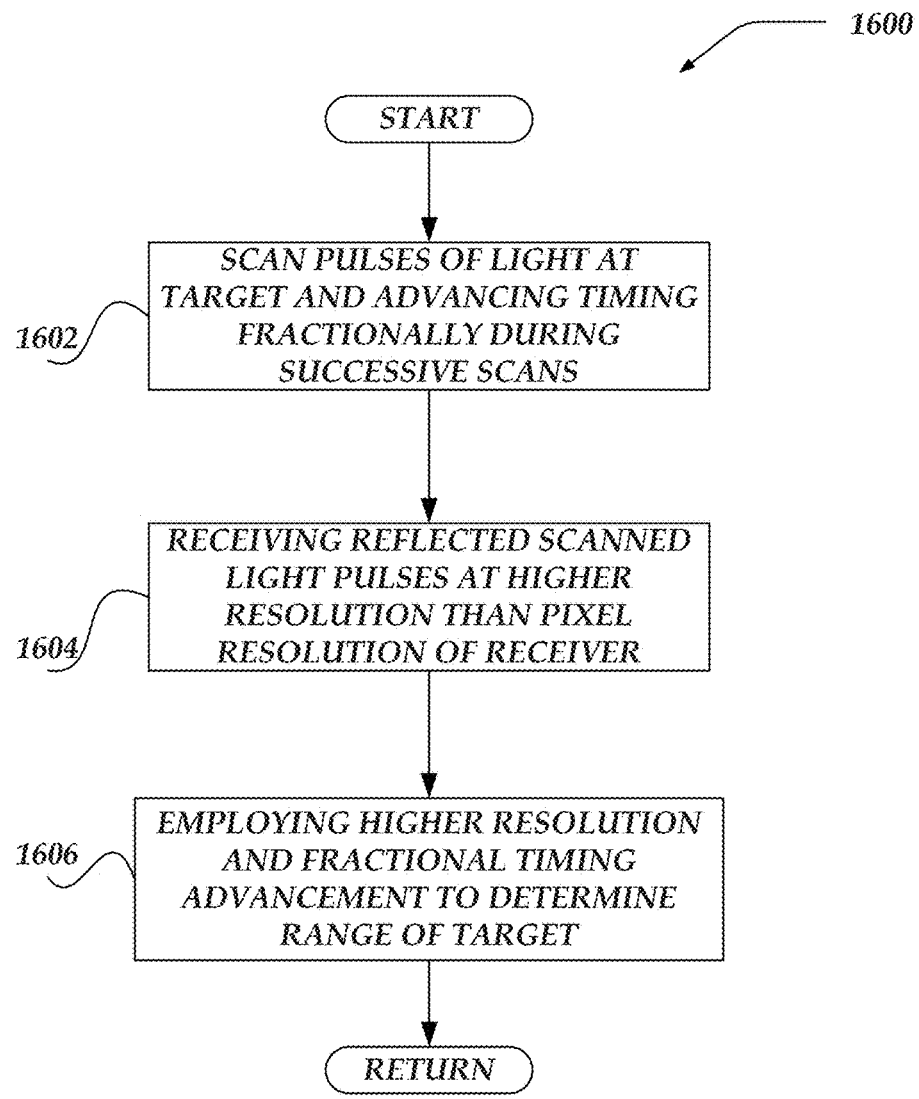
FIG. 16 illustrates a flow chart for determining a range of a target with a LIDAR system.

FIG. 16 illustrates a flow chart for providing a range for a target with a resolution that is greater than the resolution of an array of pixels employed by a receiver to sense successive scans of light reflected from the target.

Moving from a start block, the logic advances to block 1602 were scanned sequential pulses of light are directed toward the target. A timing of the light pulses is advanced by fractional increments during successive scans and is correlated to a fractional shift in direction within a telescopic view of a same pixel in an array of pixels provided by the receiver.

Stepping to block 1604, the receiver receives reflections of the scanned pulses of light from the target. Each pulse of light reflected from the target and received by the receiver illuminates a fraction of a Field of View of a pixel and is smaller than a resolution of the pixel in an array of pixels provided by the receiver. Also, the pixel array is arranged in one or more of rows or columns, and each pixel is configured to sense one or more photons of the reflected pulses of light.

Flowing to block 1606, one or more departure times of the scanned pulses of light are determined. Also, the range of the target is determined with an image resolution that is greater than a pixel resolution of the array of pixels based on the timing advancement for the fractional increments that is correlated to the scanned pulses of reflected light sensed by one or more of the array of pixels. Next, the process returns to performing other actions.

Figure 18:
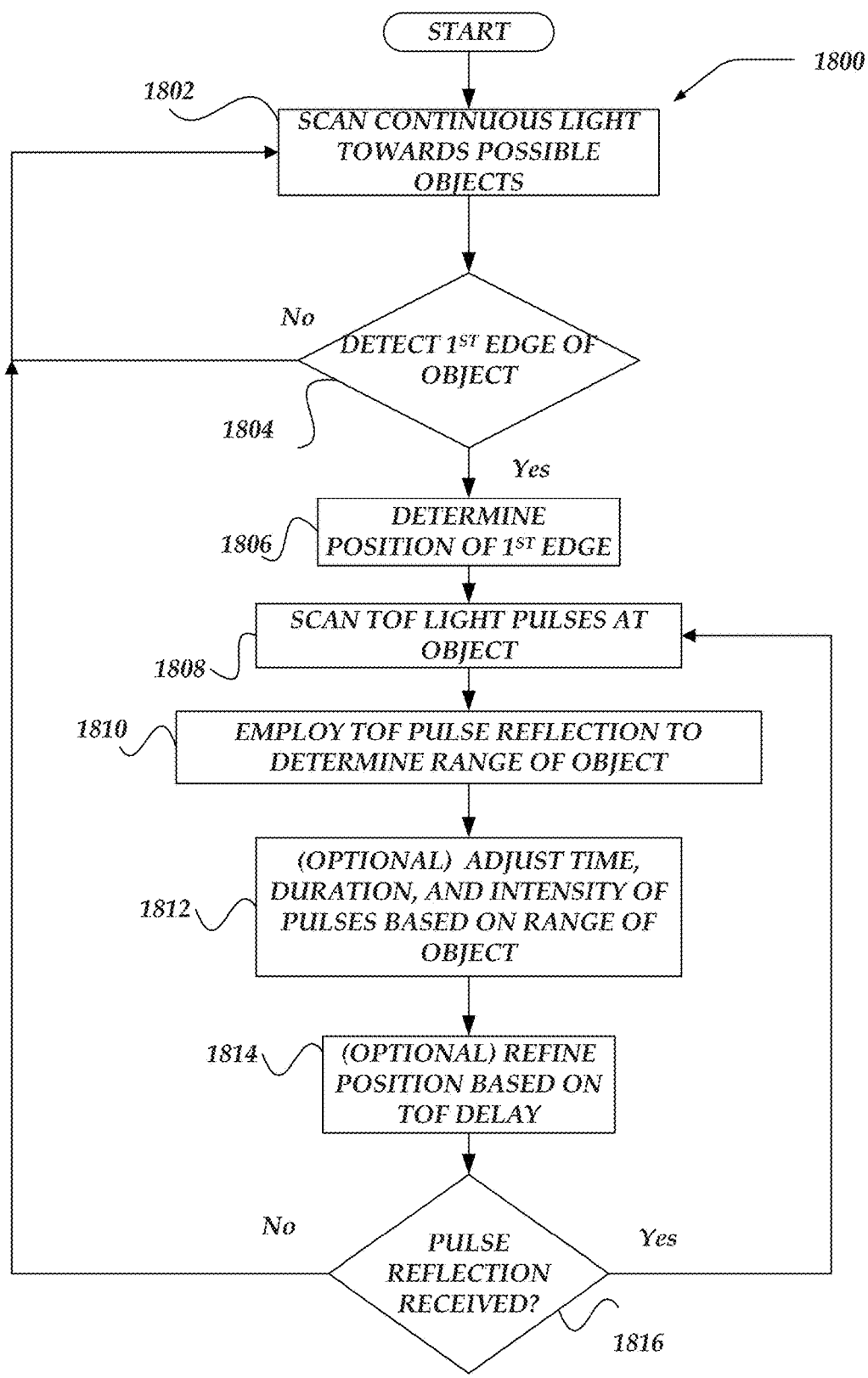
FIG. 18 illustrates a flow chart for employing scanned continuous and pulsed light to dynamically determine the contours of an object in accordance with the invention.

FIG. 18 illustrates a flow chart for employing scanned continuous and pulsed light to dynamically determine the contours of an object. The ability for an active light system position detection system such as a LIDAR to precisely detect a foreground object's contours is particularly important in robotics for grasping, picking up, catching and dexterously handling of moving objects of various shapes. Moreover, in autonomous mobility and delivery systems it greatly helps if a perceptual artificial intelligence (AI) system can be handed "cleanly cropped pixels" that strictly contain image details of the object rather than any spurious background pixels.

This method provides perceptual "foviation". For example, a robotic perceptual system employing a Convolutional Neural Network (CNN) to classify shapes and objects, may improve its response time and reduce its error rate if the CNN is provided with strictly those pixels that are illuminated by reflections from the dog, in an accurate dog shape that precisely moves like a dog. This ultra sharp edge detection enables a novel foveated version of Multi Modal Classification: Image, Shape and Motion. (MMC:ISM). The method enables a LIDAR, or other active light detection systems to dynamically locate the precise 3D locations of the edges of such objects. For this exemplary method, a 2D scanning laser beam is discussed that projects a single voxel light spot. However, substantially the same method may also be employed to enable more precise cropping and foviation when employing a 1D scanning "laser light blade".

Moving from a start block, the process steps to block 1802 where a laser beam of the Tx portion of a LIDAR system starts scanning the laser beam continuously "on" so that a constant high-intensity flow of photons is substantially and continuously transmitted towards possible targets in a Field of View of the LIDAR. In one or more embodiments, the continuous transmission of the laser beam may be provided by an ultra-rapid stream of sharp pulses ("rapid-fire laser pin-pricks"), where the spacing between these pulses is close enough to locate the edges of an object with sufficient spatial accuracy.

At block 1804, the logic determines whether photons from a rotating scanning beam of the LIDAR system first reaches an edge of an object by detecting when sufficient photons are reflected by the object's edge to be observed by a receiver of the LIDAR system (Rx). When sufficient photons (e.g. ten 405 nm photons in a SiPM or APD array) reach an avalanche pixel in an array of the receiver, this pixel avalanches at a precise arrival time $t_{xa0}$ that is captured by a time of flight (ToF) timing system, which may be a circuit built into the pixel's circuit. If the determination is affirmative, the logic passes to block 1806. However, if the determination was negative, the logic loops at decision block 1804 until an affirmative determination is made.

At block 1806, a precise recorded "arrival" time $t_{xa0}$ of the detection of an initial (first) edge position can be determined from the pixel location in the array as well as a known beam scan trajectory. Optionally, time interpolation methods and beam position and motion feedback from the Tx scan system may be employed to determine the first edge position of the object.

At block 1808, upon the receiver detecting a first edge of the object because it has induced avalanche in a pixel of it's array, the transmitter of the LIDAR (Tx) switches from scanning a substantially continuous stream of photons, to a series of rapid pulses, of very short (nanosecond) duration, with precise "departure times" and precise known pointing directions. In one or more embodiments, these pulses may be higher in intensity and ultra short in their duty cycle with substantially the same average laser power.

At block 1810, when the surface of the object reflects theses pulses, these reflections are received and arrival times recorded by the receiver (Rx) of the LIDAR system, and their ranges determined by one or more LIDAR or Triangulation methods.

Optionally, at block 1812, one or more of spacing apart in time, duration, or intensity of subsequently transmitted pulses may be adjusted by the LIDAR system based on one or more of the detected object's distance, albedo, the available power in the transmitter, or eye safety considerations. For example, a physically close and highly-reflective object may be pulsed at a greater frequency, requiring less power at least because the closeness enables a greater sufficiency of reflected photons to be detected.

Optionally, at block 1814, the observed distance of the first detected ranges of pixels, may be employed to estimate the ToF range of the object's edge accurately. Further, a known ToF delay can be subtracted from the arrival time $t_{xa0}$, the arrival event time associated with the first edge-avalanche as discussed above in regard to block 1804. Also, the departure time of those first photons reflected by the first/initial edge may be estimated ($t_{xd0}=t_{xa0}-ToF$), and from this equation a more precise instantaneous pointing direction of the scanned beam of light at departure time $t_{xd0}$ may be estimated (e.g., by time interpolation, look up, as the beam pointing direction is following a precisely known & observed scan pattern). This optional step may improve the accuracy of the initial positional estimate for the first edge pixel discussed in regard to block 1806.

At decision block 1816, a determination is made as to whether another pulse reflection is received. If false, the logic loops back to block 1802 and performs substantially the same actions again. However, if the determination at decision block 1816 is true, the process loops back to block 1808 and performs substantially the same actions again.

Additionally, substantially perfect color and contrast fusion may be provided by the precise pixel and voxel matches that are provided by the exemplary LIDAR system at the edges of objects. Further, as described above, a hyper accurate scanned laser detection system can "pin-point" the edge location within a fraction of the resolution of the SiPM pixels, and these pin-point edge voxel locations can then be matched 1-1 exactly with fine-grained color image details provided by a high-resolution camera.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for measuring a range of a target, comprising:
    emitting, by a transmitter, scanned sequential pulses of light toward the target, wherein a timing of the light pulses is advanced by fractional increments during successive scans and is correlated to a fractional shift in direction within a telescopic view of a same pixel in an array of pixels provided by the receiver;
    receiving, by the receiver, one or more reflections of the scanned pulses of light from the target, wherein each pulse of light reflected from the target and received by the receiver illuminates a fraction of a Field of View of a pixel and is smaller than a resolution of the pixel in the array of pixels provided by the receiver, and wherein the pixel array is arranged in one or more of rows or columns, and wherein each pixel is configured to sense one or more photons of the reflected pulses of light;
    determining, by one or more processor devices, one or more departure times of the scanned pulses of light; and
    determining, by the one or more processor devices, the range of the target with an image resolution of the target that is greater than a pixel resolution of the array of pixels based on the timing advancement for the fractional increments that is correlated to the scanned pulses of reflected light sensed by one or more of the array of pixels.

2. The method of claim 1, wherein the scanned pulses of light pass through or emanate from a narrow slot aperture-followed by 1 dimensional focusing optics to form a thin blade of light that is directed to the target and reflected to the receiver.

3. The method of claim 1, wherein the scanned pulses of light pass through a thin slot aperture to form a thin serrated blade of light that is directed to the target and reflected to the receiver.

4. The method of claim 1, wherein the pixels further comprise silicon photomultiplier (SiPM) pixels that can detect a single photon.

5. The method of claim 1, further comprising providing a collimating lens that collimates the scanned pulses of light emitted by the transmitter.

6. The method of claim 1, wherein the light emitted by the transmitter is laser light.

7. The method of claim 1, further comprising providing a mirror to scan the emitted light towards the target, wherein a shape of the mirror is one of planar, polygon, convex, concave, or spherical.

8. The method of claim 1, further comprising:
determining, by the one or more processor devices, one or more anticipated arrival times of the one or more scanned pulses of light reflections on one or more rows or columns of the array of pixels based on the one or more departure times; and
sequentially activating, by the one or more processor devices, one or more portions of the array of pixels arranged in the one or more rows or columns to sense the scanned pulses of light reflections based on the one or more anticipated arrival times.

9. A system to provide a range of a target, comprising:
a transmitter that emits scanned sequential pulses of light toward the target, wherein a timing of the light pulses is advanced by fractional increments during successive scans and is correlated to a fractional shift in direction within a telescopic view of a same pixel in an array of pixels provided by the receiver;
a receiver that receives one or more reflections of the scanned pulses of light from the target, wherein each pulse of light reflected from the target and received by the receiver illuminates a fraction of a Field of View of a pixel and is smaller than a resolution of the pixel in the array of pixels provided by the receiver, and wherein the pixel array is arranged in one or more of rows or columns, and wherein each pixel is configured to sense one or more photons of the reflected pulses of light;
one or more memory devices that store instructions; and
one or more processor devices that execute the stored instructions to perform actions, including:
determining one or more departure times of the scanned pulses of light; and
determining the range of the target with an image resolution of the target that is greater than a pixel resolution of the array of pixels based on the timing advancement for the fractional increments that is correlated to the scanned pulses of reflected light sensed by one or more of the array of pixels.

10. The system of claim 9, wherein the scanned pulses of light pass through or emanate from a narrow slot aperture-followed by 1 dimensional focusing optics to form a thin blade of light that is directed to the target and reflected to the receiver.

11. The system of claim 9, wherein the scanned pulses of light pass through a thin slot aperture to form a thin serrated blade of light that is directed to the target and reflected to the receiver.

12. The system of claim 9, wherein the pixels further comprise silicon photomultiplier (SiPM) pixels that can detect a single photon.

13. The system of claim 9, further comprising providing a collimating lens that collimates the scanned pulses of light emitted by the transmitter.

14. The system of claim 9, wherein the light emitted by the transmitter is laser light.

15. The system of claim 9, further comprising providing a mirror to scan the emitted light towards the target, wherein a shape of the mirror is one of planar, polygon, convex, concave, or spherical.

16. The system of claim 9, further comprising:
determining, by the one or more processor devices, one or more anticipated arrival times of the one or more scanned pulses of light reflections on one or more rows or columns of the array of pixels based on the one or more departure times; and
sequentially activating, by the one or more processor devices, one or more portions of the array of pixels arranged in the one or more rows or columns to sense the scanned pulses of light reflections based on the one or more anticipated arrival times.

17. A non-transitory processor readable storage media that includes instructions for measuring a range to a target, wherein execution of the instructions by one or more processor devices cause the one or more processor devices to perform actions, comprising:
emitting, by a transmitter, scanned sequential pulses of light toward the target, wherein a timing of the light pulses is advanced by fractional increments during successive scans and is correlated to a fractional shift in direction within a telescopic view of a same pixel in an array of pixels provided by the receiver;
receiving, by the receiver, one or more reflections of the scanned pulses of light from the target, wherein each pulse of light reflected from the target and received by the receiver illuminates a fraction of a Field of View of a pixel and is smaller than a resolution of the pixel in the array of pixels provided by the receiver, and wherein the pixel array is arranged in one or more of rows or columns, and wherein each pixel is configured to sense one or more photons of the reflected pulses of light;
determining, by one or more processor devices, one or more departure times of the scanned pulses of light; and
determining, by the one or more processor devices, the range of the target with an image resolution of the target that is greater than a pixel resolution of the array of pixels based on the timing advancement for the fractional increments that is correlated to the scanned pulses of reflected light sensed by one or more of the array of pixels.

18. The media of claim 17, wherein the scanned pulses of light pass through or emanate from a narrow slot aperture-followed by 1 dimensional focusing optics to form a thin blade of light that is directed to the target and reflected to the receiver.

19. The media of claim 17, wherein the scanned pulses of light pass through a thin slot aperture to form a thin serrated blade of light that is directed to the target and reflected to the receiver.

20. The media of claim 17, wherein the pixels further comprise silicon photomultiplier (SiPM) pixels that can detect a single photon.

* * * * *